(12) United States Patent  
Yamamoto et al.

(10) Patent No.: US 10,347,874 B2  
(45) Date of Patent: Jul. 9, 2019

(54) BATTERY PACK AND METHOD FOR MAKING SAME

(75) Inventors: Takeru Yamamoto, Fukushima (JP); Sachio Akahira, Fukushima (JP); Toshinori Saito, Fukushima (JP); Yasuhiro Oi, Fukushima (JP); Nobuya Okano, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 13/080,192

(22) Filed: Apr. 5, 2011

(65) Prior Publication Data

US 2011/0250475 A1    Oct. 13, 2011

(30) Foreign Application Priority Data

Apr. 7, 2010 (JP) .................................. 2010-088540

(51) Int. Cl.
| | |
|---|---|
| *H01M 2/02* | (2006.01) |
| *H01M 2/18* | (2006.01) |
| *H01M 10/04* | (2006.01) |
| *H01M 10/42* | (2006.01) |

(52) U.S. Cl.
CPC ....... *H01M 2/0217* (2013.01); *H01M 2/0277* (2013.01); *H01M 2/0287* (2013.01); *H01M 2/18* (2013.01); *H01M 10/04* (2013.01); *H01M 10/425* (2013.01); *H01M 10/4257* (2013.01); *H01M 2002/0297* (2013.01); *Y10T 29/49115* (2015.01)

(58) Field of Classification Search
CPC .... H01M 2/0217; H01M 2/18; H01M 2/0287; H01M 2/0277; H01M 10/04; H01M 10/4257; H01M 10/425; H01M 2002/0297; Y10T 29/49115
USPC ...................................................... 264/272.4
See application file for complete search history.

(56) References Cited

U.S. PATENT DOCUMENTS

| | | | |
|---|---|---|---|
| 6,225,778 B1 | 5/2001 | Hayama et al. | |
| 6,524,739 B1 * | 2/2003 | Iwaizono et al. ............... | 429/61 |
| 2003/0003357 A1 | 1/2003 | Tamai et al. | |
| 2003/0173709 A1 | 9/2003 | Iwaizono et al. | |

(Continued)

FOREIGN PATENT DOCUMENTS

| | | |
|---|---|---|
| CN | 1465109 | 12/2003 |
| EP | 1032108 | 8/2000 |

(Continued)

OTHER PUBLICATIONS

Definition of "alkyl groupp"—http://www.dictionary.com/browse/alkyl-group (2018).*

(Continued)

*Primary Examiner* — Eugenia Wang  
(74) *Attorney, Agent, or Firm* — Chip

(57) ABSTRACT

A battery pack includes: a battery having a main surface; and a resin layer capable of being integrated with an armor member armoring the battery so that at least a part of the main surface of the battery is exposed and covering the main surface of the battery, wherein the resin layer is formed by curing a reaction curable resin having a viscosity of not less than 80 mPa·second to less than 1000 mPa·second and a thickness of the resin layer on the main surface of the battery ranges from 0.05 mm to smaller than 0.4 mm.

11 Claims, 21 Drawing Sheets

(56) References Cited

U.S. PATENT DOCUMENTS

| | | |
|---|---|---|
| 2003/0180582 A1 | 9/2003 | Masumoto et al. |
| 2004/0048149 A1* | 3/2004 | Gross et al. ............ 429/127 |
| 2005/0164080 A1* | 7/2005 | Kozu et al. ............ 429/176 |
| 2005/0208346 A1* | 9/2005 | Moon et al. ............ 429/7 |
| 2005/0233206 A1 | 10/2005 | Puttaiah |
| 2006/0073384 A1* | 4/2006 | Heo et al. ............ 429/176 |
| 2006/0099503 A1* | 5/2006 | Lee ............ 429/176 |
| 2006/0099504 A1* | 5/2006 | Kim ............ H01M 2/027 |
| | | 429/176 |
| 2006/0127756 A1* | 6/2006 | Seo ............ 429/175 |
| 2006/0199075 A1 | 9/2006 | Moon et al. |
| 2006/0210870 A1* | 9/2006 | Moon et al. ............ 429/175 |
| 2006/0286450 A1 | 12/2006 | Yoon |
| 2008/0269365 A1* | 10/2008 | Andrew ............ C08G 18/10 |
| | | 521/124 |
| 2009/0191448 A1* | 7/2009 | Yamamoto et al. ............ 429/94 |
| 2009/0258290 A1* | 10/2009 | Lee ............ H01M 2/021 |
| | | 429/163 |

FOREIGN PATENT DOCUMENTS

| | | |
|---|---|---|
| JP | 11-111250 | 4/1999 |
| JP | 2000-243364 | 9/2000 |
| JP | 2003-178726 | 6/2003 |
| JP | 3556875 | 5/2004 |
| JP | 3614767 | 11/2004 |
| JP | 3643792 | 2/2005 |
| JP | 2008-527678 | 7/2008 |

OTHER PUBLICATIONS

Definition of "polyol"—http://www.dictionary.com/browse/polyol (2018).*
Defition of "polyol"—http://www.dictionary.com/brows/polyol (2018).*
European Patent Office, Extended European Search Report issued in connection with European Patent Application No. 11002387.6, dated May 7, 2013. (5 pages).
Final Office Action issued in U.S. Appl. No. 14/662,526 dated May 26, 2017, 25 pp.
Final Office Action issued in U.S. Appl. No. 14/662,526 dated Aug. 17, 2016, 26 pp.
Notice of Allowance for EP Patent Application No. 11002387.6, dated Dec. 11, 2017, 102 pages.
Final Office Action in U.S. Appl. No. 14/662,526, dated Feb. 28, 2018.
Non-Final Office Action cited in U.S. Appl. No. 14/662,526, dated Nov. 17, 2017, 21 pages.
Chinese Office Action dated May 16, 2014 in corresponding Chinese Patent Application No. 2011-10077729.5.
Final Office Action in U.S. Appl. No. 14/662,526 dated Dec. 6, 2018.
Non-Final Office Action in U.S. Appl. No. 14/662,526 dated Aug 24, 2018.

* cited by examiner

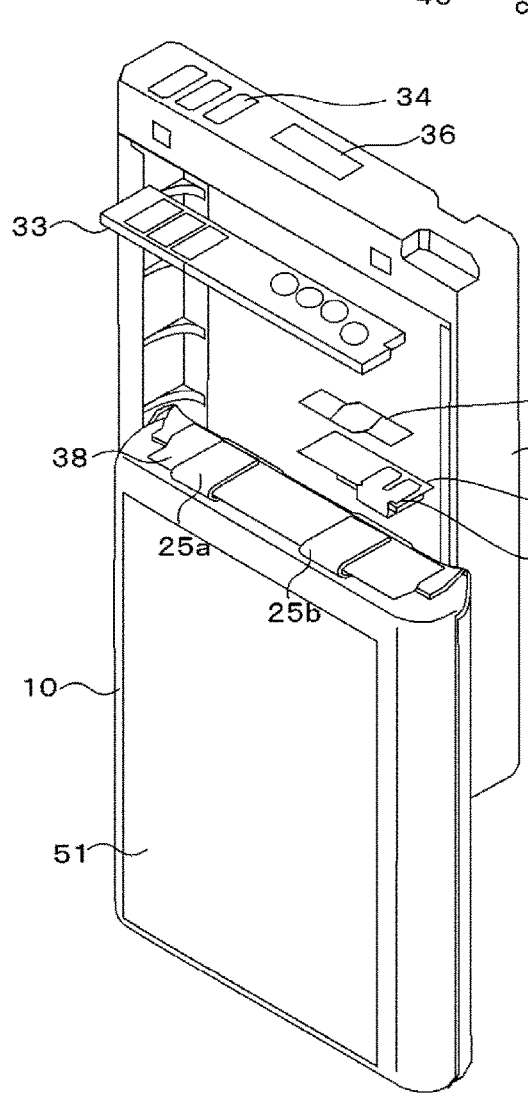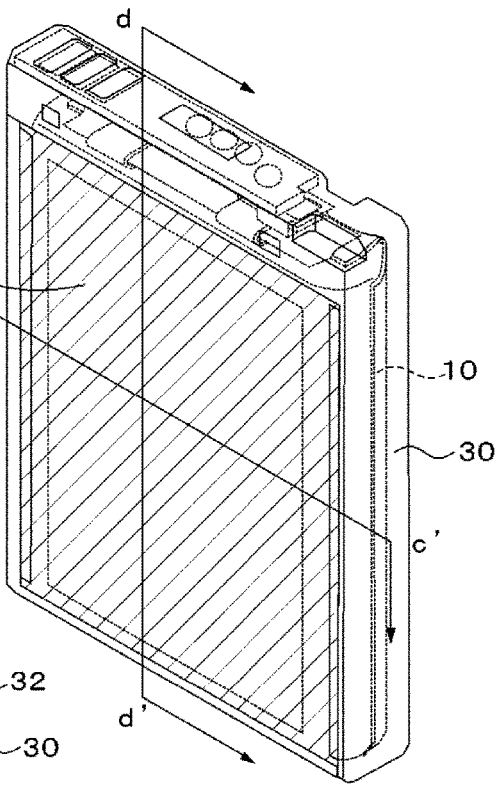

TABLE 1

| | Reaction curable resin | Cover part (thermoplastic resin) | Cover part (metal sheet) | Structure | Fixing of substrate | Manner of positioning (spacer, mold projection) | Spacer material | Content of MDI estimated from thermal decomposition GC-MS | Flame Retardant Polyol containing at least two hydroxyl groups | Manner of curing | Curing time | Viscosity of charged resin fluid | Glass transition point (Tg) (°C) | Melting point (thermal pyrolysis Tm) (°C) | Packaging material | Thickness of aluminum layer deposited on packaging material (μm) |
|---|---|---|---|---|---|---|---|---|---|---|---|---|---|---|---|---|
| Example 1 | Silicone | Polycarbonate frame part | Nil | FIG. 1 | Integral molding of substrate and resin | Mold projection | Nil | 0 | Nil | 120° C. | 30 min | 990 | 58 | 190 | Aluminum laminate | Nil |
| Example 2 | Epoxy resin | Polypropylene frame part | Nil | FIG. 1 | Riveted | Mold projection | Nil | 0 | Nil | 110° C. | 30 min | 900 | 132 | 410 | Aluminum laminate | Nil |
| Example 3 | Acrylic resin | Polypropylene frame part | Nil | FIG. 6 | Integral molding of substrate and resin | Mold projection | Nil | 0 | Nil | 100° C. | 30 min | 80 | 150 | 400 | Aluminum laminate | Nil |
| Example 4 | Polyurethane | Polypropylene frame part | Nil | FIG. 6 | Riveted | Mold projection | Nil | 18 | Nil | 90° C. | 15 min | 180 | 60 | 200 | Aluminum laminate | Nil |
| Example 5 | Polyurethane | Polypropylene frame part | One aluminum sheet (front surface) | FIG. 7 | Riveted | Metal sheet serving also as a spacer | Aluminum sheet | 83 | Nil | 85° C. | 10 min | 610 | 80 | 230 | Aluminum laminate | Nil |

FIG. 20A

TABLE 1- CONTINUED

| | Reactive curable resin | Cover part (thermo plastic resin) | Cover part (metal sheet) | Structure | Fixing of substrate | Manner of positioning (spacer, mold projection) | Spacer material | Content of MDI estimated from thermal decomposition GC-MS | Flame Retardant Polyol containing at least two hydroxyl groups | Manner of curing | Curing time | Viscosity of charged resin fluid | Glass transition point (Tg) (°C) | Melting point thermal pyrolysis Tm (°C) | Packaging material | Thickness of aluminum layer deposited on packaging material (μm) |
|---|---|---|---|---|---|---|---|---|---|---|---|---|---|---|---|---|
| Example 6 | Poly-urethane | Polypropylene frame part | One aluminum sheet (front surface) | FIG. 7 | Riveted | Mold projection | Aluminum sheet | 20 | Nil | 80° C. | 10 min | 200 | 124 | 310 | Aluminum laminate | Nil |
| Example 7 | Poly-urethane | Polypropylene frame part | One aluminum sheet (front surface) | FIG. 7 | Riveted | Metal sheet serving also as a spacer | Aluminum sheet | 80 | Nil | ° C. | 5 min | 600 | 85 | 240 | Aluminum laminate | Nil |
| Example 8 | Poly-urethane | Polycarbonate frame part | Two SUS sheets (front and back surfaces) | FIG. 9 | Riveted | Metal sheet serving also as a spacer | SUS sheet | 20 | Nil | 80° C. | 10 min | 200 | 124 | 310 | Aluminum laminate | Nil |
| Example 9 | Poly-urethane | Polyamide top cover | One aluminum U-shaped sheet | FIG. 11 | Riveted | Metal sheet serving also as a spacer | Aluminum sheet | 80 | Nil | 80° C. | 5 min | 600 | 85 | 240 | Aluminum laminate | Nil |

FIG. 20B

TABLE 1- CONTINUED

| | Reaction curable resin | Cover part (thermo-plastic resin) | Cover part (metal sheet) | Structure | Fixing of substrate | Manner of positioning (spacer, weld projection) | Spacer material | Content of MDI estimated from thermal decomposition GC-MS | Flame Retardant Polyol containing at least two hydroxyl groups | Manner of curing | Curing time | Viscosity of charged resin fluid | Glass transition point (Tg) (°C) | Melting point (thermal pyrolysis Tm (°C) | Packaging material | Thickness of aluminum layer deposited on packaging material (μm) |
|---|---|---|---|---|---|---|---|---|---|---|---|---|---|---|---|---|
| Example 10 | Poly-urethane | Poly-amide top cover | (front surface) One SUS U-shaped sheet (back surface) | FIG. 11 | Riveted | Metal sheet serving also as a spacer | SUS sheet | 37 | (CH$_3$CH$_2$)$_2$POCH$_2$P (CH$_2$OH)$_3$ | 80° C. | 5 min | 400 | 120 | 300 | Aluminum laminate | Nil |
| Example 11 | Poly-urethane | Poly-carbonate frame part | Nil | FIG. 13 | Riveted | Straight spacer | Poly-ethylene tape | 72 | (CH$_3$CH$_2$)$_2$POCH$_2$Si(CH$_2$CH$_2$OH)$_3$ | 80° C. | 5 min | 400 | 110 | 260 | Aluminum laminate | 0.03 |
| Example 12 | Poly-urethane | Poly-carbonate frame part | Nil | FIG. 13 | Riveted | Straight spacer | Paper tape | 40 | (CH$_3$CH$_2$)$_2$POCH$_2$N (CH$_2$OH)$_2$ | 80° C. | 5 min | 400 | 110 | 260 | Aluminum laminate | 10 |
| Example 13 | Poly-urethane | Poly-carbonate frame part | Nil | FIG. 13 | Riveted | Zigzag spacer | Nomex tape | 55 | (CH$_3$CH$_2$)$_2$POCH$_2$N(CH$_2$CH$_2$OH)$_2$ | 80° C. | 5 min | 400 | 110 | 260 | Aluminum laminate | 2 |
| Example 14 | Poly-urethane | Poly-carbonate frame part | Nil | FIG. 13 | Riveted | Zigzag spacer | Nomex tape | 60 | Nil | 80° C. | 4 min | 400 | 110 | 260 | Aluminum laminate | 1 |
| Example 15 | Poly-urethane | Poly-carbonate frame part | Nil | FIG. 13 | Riveted | Indented spacer | Nomex tape | 70 | Nil | 80° C. | 3 min | 400 | 110 | 260 | Poly-ethylene film + two layers of PET film | 0.8 |

FIG. 20C

TABLE 1- CONTINUED

| | Reaction curable resin | Cover part (thermoplastic resin) | Cover part (metal sheet) | Structure | Fixing of substrate | Manner of positioning (spacer, mold projection) | Spacer material | Content of MDI estimated from thermal decomposition GC-MS | Flame Retardant Polyol containing at least two hydroxyl groups | Manner of curing | Curing time | Viscosity of charged resin fluid | Glass transition point (Tg) (°C) | Melting point (thermal pyrolysis Tm) (°C) | Packaging material | Thickness of aluminum layer deposited on packaging material (μm) |
|---|---|---|---|---|---|---|---|---|---|---|---|---|---|---|---|---|
| Example 16 | Poly-urethane | Poly-carbonate top cover | Nil | FIG. 17 | Riveted | Indented spacer | Nomex tape | 60 | Nil | 80° C. | 2 min | 400 | 110 | 260 | Vacuum-deposited poly-ethylene film + two layers of PET film | 0.8 |
| Example 17 | Poly-urethane | Poly-carbonate top cover | Nil | FIG. 17 | Riveted | Wave-shaped spacer | Glass cross tape | 60 | Nil | 75° C. | 1 min | 400 | 110 | 260 | Single layered vacuum-deposited poly-propylene film | 0.8 |
| Example 18 | Poly-urethane | Poly-amide top cover | Nil | FIG. 17 | Integral molding of substrate and resin | Wave-shaped spacer | PET tape | 60 | (CH$_3$CH$_2$)$_2$POCH$_2$NCH$_2$CH$_2$OH)$_2$ + OP(OPhCH$_3$)$_3$ | 50° C. | 1 min | 400 | 110 | 260 | Single layered vacuum-deposited poly-propylene film | 0.8 |
| Comparative Example 1 | Silicone | Poly-carbonate frame part | Nil | FIG. 1 | Integral molding of substrate and resin | Mold projection | Nil | 0 | Nil | 120° C. | 20 min | 1000 | -20 | 260 | Aluminum laminate | Nil |

FIG. 20D

TABLE 1- CONTINUED

| | Reaction curable resin | Cover part (thermoplastic resin) | Cover part (metal sheet) | Structure | Fixing of substrate | Manner of positioning (spacer, mold projection) | Spacer material | Content of MDI estimated from thermal decomposition position GC-MS | Flame Retardant Polyol containing at least two hydroxyl groups | Manner of curing | Curing time | Viscosity of charged resin fluid | Glass transition point (Tg) (°C) | Melting point (thermal pyrolysis Tm) (°C) | Packaging material | Thickness of aluminum layer deposited on packaging material (μm) |
|---|---|---|---|---|---|---|---|---|---|---|---|---|---|---|---|---|
| Comparative Example 2 | Epoxy resin | Polyethylene terephthalate frame part | Nil | FIG. 1 | Integral molding of substrate and resin | Mold projection | Nil | 0 | Nil | Allowed to stand at a normal temperature | One day | 70 | 155 | 220 | Aluminum laminate | Nil |
| Comparative Example 3 | Thermoplastic ABS | Polypropylene frame part | Nil | FIG. 1 | Integral molding of substrate and resin | Mold projection | Nil | 0 | Nil | Resin melt extrusion molding at 120° C. | 20 sec | 2000 | 120 | 240 | Aluminum laminate | Nil |
| Comparative Example 4 | Thermoplastic polyurethane | Polyethylene frame part | Nil | FIG. 1 | Integral molding of substrate and resin | Mold projection | Nil | 0 | Nil | Resin melt extrusion molding at 120° C. | 20 sec | 1500 | 110 | 220 | Aluminum laminate | Nil |
| Comparative Example 5 | Thermoplastic polyamide | Polypropylene frame part | Nil | FIG. 1 | Integral molding of substrate and resin | Mold projection | Nil | 0 | Nil | Resin melt extrusion molding at 180° C. | 30 sec | 1000 | 50 | 190 | Aluminum laminate | Nil |
| Comparative Example 6 | Urethane | Polymethylvinyl acrylate frame part | Nil | FIG. 1 | Integral molding of substrate and resin | Mold projection | Nil | 0 | Nil | 120° C. | 30 min | 990 | 58 | 190 | Aluminum laminate | Nil |

FIG. 20E

BATTERY PACK AND METHOD FOR MAKING SAME

BACKGROUND OF THE INVENTION

1. Field of the Invention

This invention relates to a battery pack including a non-aqueous electrolytic secondary battery and a method for making the same. More particularly, the invention relates to a battery pack wherein a non-aqueous electrolytic secondary battery, a circuit board, and other battery pack components are integrated by resin molding and a method making such a battery pack.

2. Description of the Related Art

In recent years, a number of portable electronic devices including camera-integrated video tape recorders, cell phones and portable personal computers have appeared on the market and their reduction in size and weight has been promoted. As such electronic devices are reduced in size and weight, it is required that battery packs used as a portable power supply therefor have a high energy, be downsized and be light in weight. A high-capacity lithium ion secondary battery is now used as a battery for these battery packs.

The lithium ion secondary battery is provided with a battery element having a positive electrode and a negative electrode capable of doping and de-doping lithium ions, and the battery element is sealed in a metal can or metal laminate film and is controlled by means of a circuit board electrically connected to the battery element. With existing lithium ion secondary batteries, some battery pack is so configured that it is accommodated into two vertically-divided accommodation cases along with a circuit board (see, for example, Japanese Patent Nos. 3556875, 3614767, and 3643792).

With the battery pack configured to accommodate a lithium ion secondary battery and a circuit board in the two vertically-divided accommodation cases, the accommodation cases need to have a satisfactory thickness so as to protect the lithium ion secondary battery and the circuit board from external impact. In case where the two vertically-divided accommodation cases are bonded together by means of a double-faced adhesive tape or by ultrasonic welding, the accommodation cases should have a thickness sufficient therefor. This in turn results in an increased thickness and weight of the battery pack as a whole.

With the battery pack set forth in Japanese Patent No. 3614767, there is used a metal can-armored lithium ion secondary battery and thus, a high dimensional accuracy is likely to be obtained. However, the thickness and weight of the battery pack increase. In contrast thereto, with battery packs making use of a laminated lithium ion secondary battery armored with a laminate film, they can be made thinner and lighter in weight than the battery packs using the lithium ion battery armored with a metal can.

On the other hand, with the battery pack using a laminated lithium ion secondary battery, the dimensional variation of a battery element is so great that a difficulty is involved in enhancing a dimensional accuracy and mechanical strength is inconveniently low.

SUMMARY OF THE INVENTION

For a battery pack making use of a laminated lithium ion secondary battery, there has been proposed an armor case-free battery pack. In this battery pack, a circuit board, etc., are assembled with the laminated lithium ion secondary battery, which is temporarily mounted in a molding space of a mold for forming a resin molding. A molten resin is injected into the molding space and subsequently cured to obtain the battery pack. In the battery pack, the resin molding forms part of an armor case of the battery pack and also serves to integrally fix a circuit board, connection terminals and a battery therewith.

In this battery pack, the laminated lithium ion secondary battery is used, with the attendant drawback that mechanical strength is low. We have found that this drawback can be overcome in such a way that when the thickness of the resin molding at a portion covering the side surfaces of the lithium ion secondary battery is greater than the thickness of the resin molding at portions covering the main surfaces of the battery, mechanical strength is improved.

However, in the case where the portion of the resin molding covering the side surfaces of the battery is greater in thickness than the resin molded portion covering the main surfaces of the battery, mechanical strength is, in fact, improved. Nevertheless, upon the resin molding, a resin melt preferentially flows into a molding space that has been so designed as to secure a given thickness of the resin molding at a portion covering the side surfaces of the lithium ion secondary battery, for which a coverage failure takes place wherein part of the main surfaces is not covered with the molded resin, with the attendant problem that the characteristics of the battery pack lower. In case where the resin molded portion covering the main surface of the secondary battery is formed as thin, it is required to suppress the occurrence of the coverage failure of the secondary battery.

Accordingly, it is desirable to provide a battery pack that is able to suppress coverage failure thereby suppressing the battery pack characteristics from lowering and also to provide a method for making such a battery pack.

According to one embodiment of the invention, there is provided a battery pack including: a battery having a main surface; and a resin layer capable of being integrated with an armor member armoring the battery so that at least a part of the main surface of the battery is exposed and covering the main surface of the battery, wherein the resin layer is formed by curing a reaction curable resin having a viscosity of not less than 80 mPa·second to less than 1000 mPa·second and a thickness of the resin layer on the main surface of the battery ranges from 0.05 mm to smaller than 0.4 mm.

According to another embodiment of the invention, there is provided a method for making a battery pack including the steps of assembling a battery having main surfaces and an armor member armoring the battery in such a way as to permit at least a part of the main surfaces of the battery to be exposed, placing the assembled battery and the armor member in a molding space in a mold, charging a reaction curable resin having a viscosity of from 80 mPa·second to less than 1000 mPa·second into the mold, and curing the reaction curable resin so that a resin layer covering the main surfaces of the battery is formed a thickness of from 0.05 mm to smaller than 0.4 m.

In these embodiments, the resin layer covering the main surfaces of the battery is obtained by curing the reaction curable resin having a viscosity of from 80 mPa·second to less than 1000 mPa·second. In doing so, the resin layer having a thickness of from 0.05 mm to smaller than 0.4 mm is formed on the main surfaces of the battery, thereby enabling the coverage failure of the battery pack to be avoided.

According to the invention, coverage failure can be avoided and thus, battery pack characteristics can be suppressed from lowering.

BRIEF DESCRIPTION OF THE DRAWINGS

FIGS. 7A and 7B are, respectively, a schematic view showing a configuration example of a battery pack according to a further embodiment of the invention;

FIGS. 20A-20E are tabulation of results of tests conducted on an embodiment of the invention.

FIGS. 20A, 20B and 20D illustrate a table showing the resin viscosities in Examples 1 to 18 that are controlled within an optimum range.

FIGS. 20C and 20E illustrate a table showing comparative examples 1 to 6, in which the resin viscosities are outside the optimum range.

FIGS. 20F and 20G are tabulation of results of tests conducted on an embodiment of the invention.

DETAILED DESCRIPTION OF THE PREFERRED EMBODIMENTS

Figure 1A:
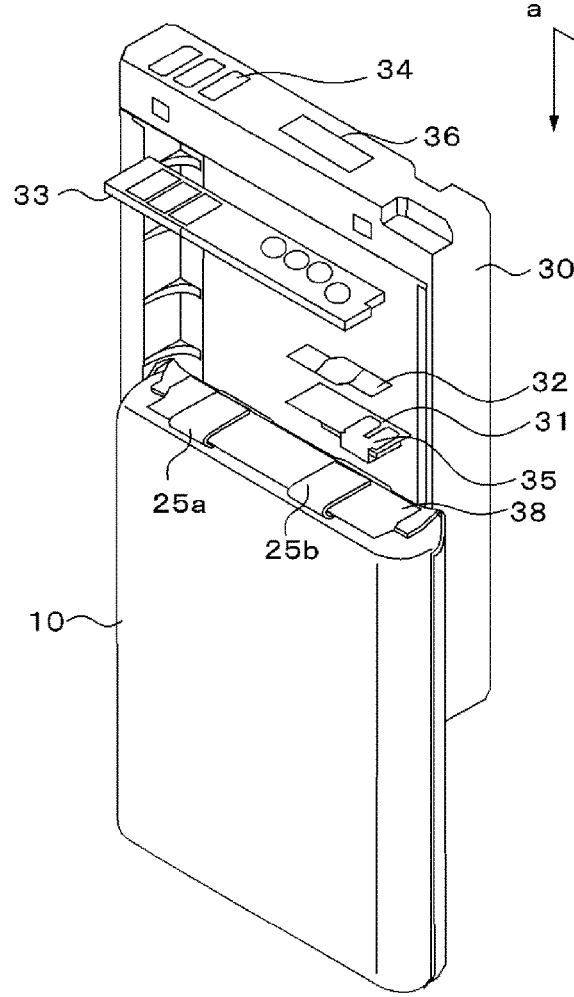
FIGS. 1A and 1B are, respectively, a schematic view showing a configuration example of a battery pack according to an embodiment of the invention.

The embodiments of the invention are described with reference to the accompanying drawings wherein like reference numerals indicate like parts or members throughout the drawings, which are not repeatedly illustrated herein.

The embodiments are described in the following order.
1. First embodiment (first example of a battery pack)
2. Second embodiment (second example of a battery pack)
3. Third embodiment (third example of a battery pack)
4. Fourth embodiment (fourth example of a battery pack)
5. Fifth embodiment (fifth example of a battery pack)
6. Sixth embodiment (sixth example of a battery pack)
7. Seventh embodiment (seventh example of a battery pack)
8. Other embodiment (a variation)

1. First Embodiment (Structure of a Battery Pack)

Figure 1B:
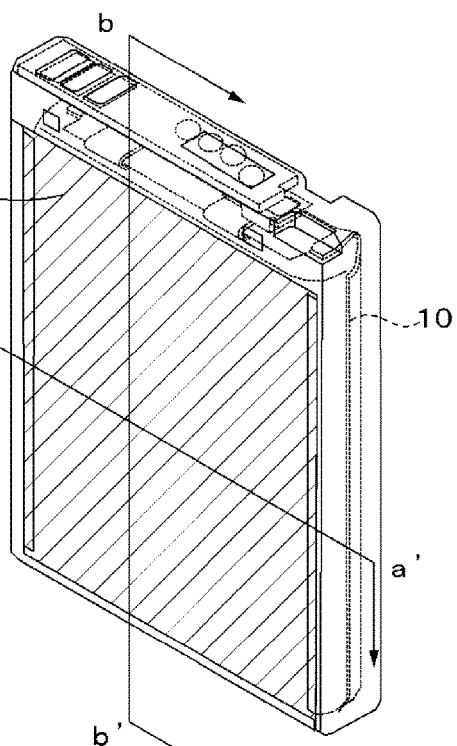
Figure 2A:
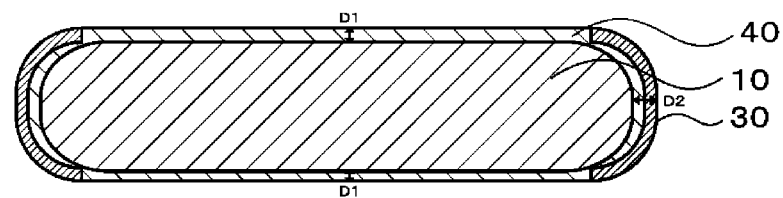
FIGS. 2A and 2B are, respectively, a schematic sectional view showing a configuration example of the battery pack according to the embodiment of the invention.
Figure 2B:
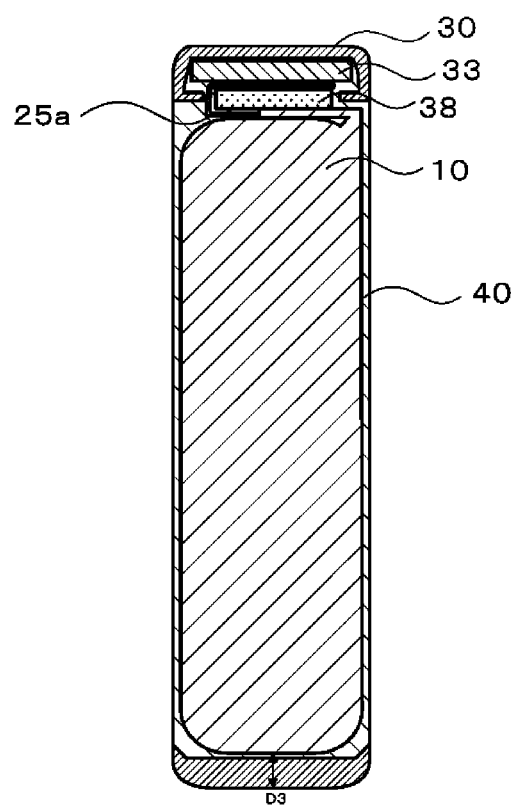

A battery pack according to a first embodiment of the invention is now described. FIG. 1A is an exploded, perspective view showing a configuration example of a battery pack according to a first embodiment of the invention. FIG. 1B is an appearance perspective view showing a configuration example of the battery pack according to the first embodiment of the invention. FIG. 2A is a sectional view taken along the line a-a' of FIG. 1B. FIG. 2B is a sectional view taken along the line b-b' of FIG. 1B.

As shown in FIGS. 1A and 1B, this battery pack includes a frame 30, a battery 10 and a circuit board 33, which are essential component elements of the battery pack. The battery pack is provided with other parts, which are connected to the essential component elements and/or arranged in position of the essential component elements and include a PTC (Positive Temperature Coefficient) protecting tape 31, a PTC element 32, a negative electrode fitting 35 and a submergence detecting seal 36 capable of color change when deposited with moisture. This battery pack is a substantially rectangular parallelepiped-shaped resin molded body wherein the battery 10, circuit board 33 and other parts such as the PTC element 32 and the frame 30 are assembled to obtain an assembly and this assembly is integrated by resin molding of a reaction curable resin. In this battery pack, the assembly of the battery 10, circuit board 33 and other parts including the PTC element 32 are armored with the frame 30 and an armor member 40 made of the reaction curable resin.

As shown in FIGS. 2A and 2B, the battery is covered entirely with the armor member 40. Moreover, the battery 10 is covered through the armor member 40 with the frame 30 at the side surfaces and at part of the upper and lower surfaces thereof. In the battery pack, a thickness D1 (which may be hereinafter referred to arbitrarily as maximum surface thickness D1) of the armor member on the upper and lower surfaces, which are the main surfaces of the battery, is preferably from 0.05 mm to smaller than 0.4 mm per unit surface, more preferably not larger than 0.25 mm, in order to more improve a volume energy density. In addition, a thickness D2 of the armor member covering a side surface of the battery 10 (hereinafter referred to arbitrarily as short side thickness D2) and a thickness D3 (hereinafter referred to arbitrarily as long side thickness D3) are preferably from 1.2 times to 6 times the maximum surface thickness D1, respectively, so as to improve strength. In order to more improve the strength, they are more preferably at 2 times to not greater than 4 times the maximum surface thickness D1.

It will be noted that the maximum surface thickness D1 means an average thickness in case where the thickness of the armor member 40 starting from the main surface of the battery 10 as an initial point of measurement is measured at three points in the vicinity of the center. The short side thickness is determined while setting the most projected point along the short side as a starting point of measurement and the surface of the battery pack as an end point of the measurement. That is, it means a length of the armored portion along the short side. The long side thickness D3 is determined while setting the most projected point along the length of the battery 10 as a starting point of measurement and the surface of the battery pack as an end point of the measurement. That is, this thickness corresponds to a length of the armored portion along the length.

(Battery)

Figure 3:
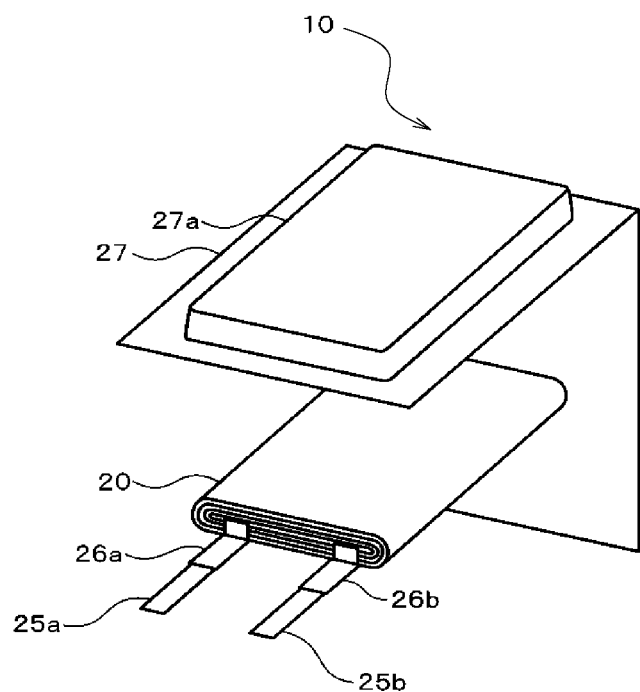
FIG. 3 is an exploded, perspective view of a configuration example of the battery.
Figure 4:
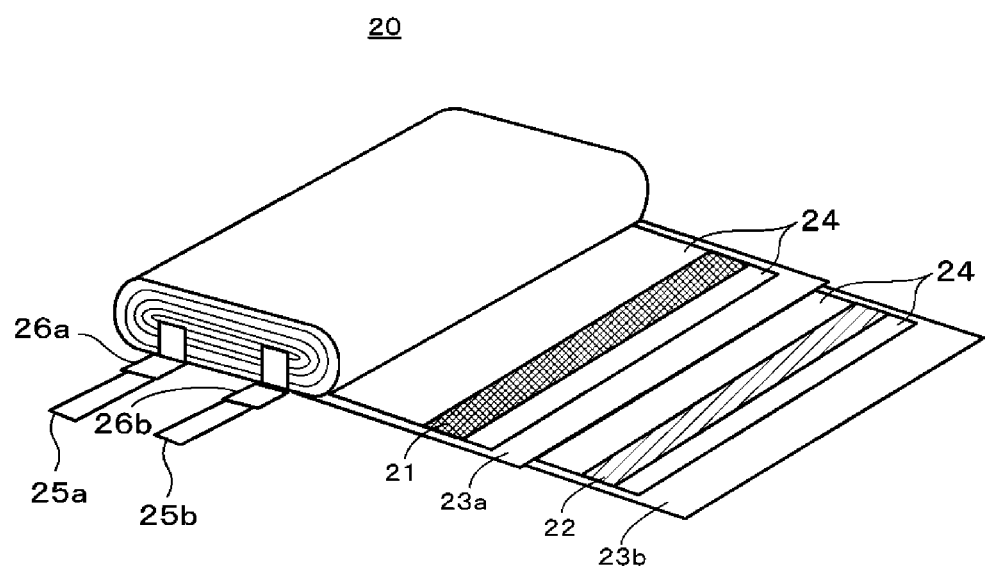
FIG. 4 is a perspective view showing a configuration example of a battery element.

An instance of the battery 10 is now illustrated. As shown in FIGS. 3 and 4, the battery 10 is one wherein a battery element 20 having a positive electrode 21 and a negative electrode 22 convolutely wound or laminated through separators 23a, 23b is packed with a laminated film 27 serving as a packaging material. As particularly shown in FIG. 3, the battery element 20 is accommodated in a rectangle-shaped recess 27a formed in the packaging laminate film 27 and the peripheral portions (three sides except for the bent portion) are heat sealed. Portions bonded with the laminate film 27 are terrace portions. The terrace portions at opposite sides of the recess 27a are folded toward the direction of the recess 27a.

It will be noted that the laminate film 27 serving as a packaging material may be a metal laminated film, e.g. an aluminum laminate film. The aluminum laminate film is preferably one that is adapted for drawing and is suited for forming the recess 27a accommodating the battery element 20 therein.

The aluminum laminate film has a laminate structure wherein an aluminum layer is provided on opposite sides thereof with an adhesive layer and a surface protecting layer. The aluminum laminate film preferably has, in the order as viewed from the inner side i.e. the surface side of the battery element 20, a cast polypropylene layer (CPP layer) serving as an adhesive layer, an aluminum layer used as a metal layer, and a nylon layer or polyethylene terephthalate layer (PET layer) serving as a surface protective layer.

As shown in FIG. 4, a band-shaped positive electrode 21, a separator 23a, a band-shaped negative electrode 22 disposed in face-to-face relation with the positive electrode 21, and a separator 23b are successively laminated and the resulting laminate is convolutely wound along the length thereof. The positive electrode 21 and negative electrode 22 are, respectively, coated with a gel electrolyte 24 on opposite sides thereof. A positive electrode lead 25a connected to the positive electrode 21 and a negative electrode lead 25b connected to the negative electrode 22 extend from the battery element 20, respectively. The positive electrode lead 25a and the negative electrode lead 25b are, respectively, covered with resin piece sealants 26a and 26b, such as of a maleic anhydride-modified polypropylene (PP).

The components of the battery 10 are more particularly described below. It should be noted herein that the invention is applicable to those batteries or cells other than the battery set out hereinbelow. As to electrolytes, for example, there may be used not only gel electrolytes, but also liquid or solid electrolytes.

[Positive Electrode]

The positive electrode 21 is one wherein a positive-electrode active material layer containing a positive electrode active material is formed on opposite sides of a positive electrode current collector. As the current collector, there may be used a metallic foil such as, for example, an aluminum (Al) foil a nickel (Ni) foil or a stainless steel (SUS) foil.

The positive-electrode active material layer is formed, for example, of a positive-electrode active material, a conducting agent, and a binder. The positive-electrode active material used is a composite oxide of lithium and a transition metal mainly composed of $Li_xMO_2$ wherein M represents at least one transition metal, and x may differ depending on the charge or discharge conditions of battery and is generally a value within a range of not smaller than 0.05 to not larger than 1.10. The transition metal of the lithium composite oxide may be cobalt (Co), nickel (Ni) or manganese (Mg).

Specific examples of the lithium composite oxide include lithium cobaltate ($LiCoO_2$), lithium nickelate ($LiNiO_2$), lithium manganate ($LiMg_2O_4$) and the like. Alternatively, there may be also used solid solutions wherein part of a transition metal is replaced by other element. For example, mention is made of lithium nickel cobalt composite oxides (e.g. $LiNi_{0.5}Ci_{0.5}O_2$, $LiNi_{0.8}Ci_{0.2}O_2$ and the like). These lithium composite oxides are able to generate high voltage and are excellent in energy density. Still alternatively, there may be used phosphate compounds having an olivine structure, such as lithium iron phosphate ($LiFePO_4$), $Li_xFe_{1-y}M2_yPO_4$ wherein M2 represents at least one of the group consisting of manganese (Mn), nickel (Ni), cobalt (Co), zinc (Zn) and magnesium (Mg) and x is a value within a range of $0.9 \leq x \leq 1$. Yet alternatively, there may be used as a positive electrode active material lithium-free metal sulfides or metal oxides such as $TiS_2$, $MoS_2$, $NbSe_2$, $V_2O_5$ and the like. These may be used in admixture of a plurality of these materials as a positive electrode active material.

The conductive materials include, for example, carbon materials such as carbon black, graphite and the like. The binders used include, for example, polyvinylidene fluoride (PVdF), polytetrafluoroethylene (PTFE) and the like. The solvents include, for example, N-methyl-2-pyrrolidone (NMP) and the like.

[Negative Electrode]

The negative electrode 22 is one obtained by forming a negative electrode active layer containing a negative electrode active material on opposite sides of a current collector for negative electrode. The current collector includes a metallic foil such as, for example, a copper (Cu) foil, a nickel (Ni) foil, a stainless steel (SUS) foil or the like.

The negative electrode active material layer is formed, for example, of a negative electrode active material and, if necessary, a conductive material and a binder. The negative electrode active material used includes a lithium metal, a lithium alloy or a carbon material capable of doping and de-doping lithium, or a composite material of a metallic material and a carbon material. In particular, as a carbon material capable of doping or de-doping lithium, mention is made of graphite, hardly graphitizable carbon, readily graphitizable carbon and the like. More specifically, there may be used carbon materials such as pyrolyzed carbons, cokes (e.g. pitch coke, needle coke, and petroleum coke), graphites, glassy carbons, fired organic polymers (those obtained by firing and graphitizing phenolic resins, furan resins and the like at appropriate temperatures), carbon fibers, active carbon and the like. Moreover, those materials capable of doping and de-doping lithium include polymers such as polyacetylene, polypyrrole and the like and oxides such as $SnO_2$ and the like.

Although various types of metals are usable as a material alloyable with lithium, there are frequently used tin (Sn), cobalt (Co), indium (In), aluminum (Al), silicon (Si) and alloys thereof. Where metallic lithium is used, it is not always necessary that powder be coated as a film by use of a binder, but a rolled lithium sheet may be used.

The binders used include polyvinylidene fluoride (PVdF), styrene butadiene rubber (SBR), etc. The solvents include, for example, N-methyl-2-pyrrolidone (NMP), methyl ethyl ketone (MEK) and the like.

[Electrolyte]

For an electrolyte, electrolytic salts and non-aqueous solvents, both ordinarily used in lithium ion secondary batteries, are usable. The non-aqueous solvents include ethylene carbonate (EC), propylene carbonate (PC), γ-butyrolactone, dimethyl carbonate (DMC), diethyl carbonate (DEC), ethylmethyl carbonate (EMC), dipropyl carbonate (DPC), ethylpropyl carbonate (EPC) and the above compounds wherein the hydrogen of the carbonate ester is replaced by a halogen. These solvents may be used singly or in admixture as having a given formulation of a plurality thereof.

The electrolytic salts are ones capable of being dissolved in non-aqueous solvents, wherein cations and anions are in combination. The cation includes an alkali metal or an alkaline earth metal. The anion includes $Cl^-$, $Br^-$, $I^-$, $SCN^-$, $ClO_4^-$, $BF_4^-$, $PF_6^-$, $CF_3SO_3^-$ or the like. More specifically, mention is made of lithium trifluorophosphate ($LiPF_6$), lithium tetrafluoroborate ($LiBF_4$), lithium bis (trifluoromethanesulfonyl)imide ($LiN(CF_3SO_2)_2$), lithium bis (pentafluoromethanesulfonyl)imide ($LiN(C_2F_5SO_2)_2$) lithium perchlorate ($LiClO_4$) and the like. As to the concentration of the electrolyte, no problem is involved if the electrolyte is able to be dissolved in solvent and the lithium ion concentration is preferably within a range of from 0.4 mol/kg to 2.0 mol/kg relative to a non-aqueous solvent.

If a polymeric electrolyte is used, there can be obtained such a polymer electrolyte by mixing a non-aqueous solvent and an electrolytic salt to provide a gel electrolyte, and taking the gel electrolyte in a matrix polymer. The matrix polymer has a characteristic of compatibility with a non-aqueous solvent. As such a matrix polymer, there are used a silicone gel, an acrylic gel, an acrylonitrile gel, a polyphosphazene-modified polymer, polyethylene oxide, polypropylene oxide, and composite polymers, crosslinked polymers and modified polymers thereof. The fluorine-based polymers include polyvinylidene fluoride (PVdF), copolymers containing repeating units of vinylidene fluoride (VdF) and hexafluoropropylene (HFP), copolymers containing repeating units of vinylidene fluoride (VdF) and trifluoroethylene (TFE) and the like. These polymers may be used singly or in combination of two or more.

[Separator]

The separators 23a and 23b are, respectively, constituted, for example, of porous membranes made of polyolefin-based materials such as polypropylene (PP) or polyethylene or inorganic materials such as ceramic non-woven fabrics. The laminate structures of these two or more porous membranes may be used. Among them, porous films of polyethylene or polypropylene are most effective.

In general, the thickness of the separator is preferably in the range of from 5 µm to 50 µm, more preferably from 7 µm to 30 µm. If the separator is too thick, a fill of an active material lowers, resulting in a reduced battery capacity and also reduced ion conductivity, thereby lowering current characteristics. In contrast, too thin a separator lowers the mechanical strength of film.

(Circuit Board)

The circuit board 33 is mounted with a charge/discharge FET (field effect transistor), a protecting circuit including IC and carrying out monitoring of a secondary battery and the control of the charge/discharge FET, an ID resistor for discriminating a battery pack, a connector connected to outside and the like. The circuit board 33 is provided, for example, with three contact points.

The charge/discharge control FET and the protecting circuit including IC and carrying out the control of the charge/discharge control FET monitor a voltage of the secondary battery wherein if the voltage exceeds 4.3 V to 4.4 V, the charge/discharge control FET is turned off to prohibit charge. Moreover, if a terminal voltage of the secondary battery is overdischarged to a level of discharge prohibition voltage so that the secondary battery voltage becomes lower than a discharge prohibition voltage, the discharge control FET is turned off thereby prohibiting discharge.

(PTC Element)

The PTC element 32 is a part, which serves to interrupt a current circuit when the battery becomes high in temperature thereby preventing the thermal runaway of the battery. The PTC element 32 is, for example, in series connection with the battery 10 and when the temperature of the battery 10 is higher than a preset temperature, the electric resistance thereof abruptly increases, so that the current passing to the battery 10 is substantially interrupted.

(Frame)

The frame 30 is a resin molded product, which covers through an armor member 40 part of an upper surface (i.e. a face at a side where the recess 27a is formed) and a lower surface of the battery 10, a front surface (i.e. a face at a side where leads are extending), a rear surface, and a left side surface and a right side surface.

The frame 30 is preferably made of a thermoplastic resin such as a polycarbonate, polypropylene, a polyamide or the like. This is because the use of a thermoplastic resin that is shorter in molding cycle than a thermosetting resin is responsible for a quick and inexpensive support against geometric variations such as of top and bottom sides suffering a great switching frequency as a battery pack.

The frame 30 corresponds to the shape of the battery 10 with respect to the front surface, rear surface, left side surface, right side surface, upper surface and lower surface and forms a space wherein the battery 10 can be encased. The upper and lower surfaces of the frame 30 are, respectively, so shaped as to be partly cut away inside the surface in a rectangular form so as to allow part of the upper and lower surfaces of the battery 10 to be exposed when assembled with the battery.

The frame 30 has a space capable of accommodating the circuit board 33 at the inner side of the front surface and the circuit board 33 is placed in this space. The circuit board 33 is in intimate contact with and secured to the inner side surface of the frame 30 such as, for example, by means of rivets. The riveted, intimate contact and fixing of the circuit board with the inner surface of the frame 30 can prevent a reaction curable resin having high fluidity from flowing toward the terminal faces of the circuit board 33. As will be described hereinafter, in the course of the molding step of the reaction curable resin, reliable positioning of the circuit board 33 is possible. At the front of the frame 30, a plurality of openings 34 are provided and the circuit board 33 accommodated in the frame 30 ensures an approach to outside through the openings 34 at contact points thereof. It will be noted that a resin molded board, made of a resin such as a polyamide, along with the frame 30 may be used as the circuit board 33.

(Armor Member)

The armor member 40 is formed of a reaction curable resin such as a thermosetting resin curable by thermal reaction, a UV-curable resin curable by reaction under UV light or the like. The armor member 40 is a resin molded member formed by curing of a reaction curable resin.

(Reaction Curable Resin)

The reaction curable resin includes at least one member selected from urethane resins, epoxy resins, acrylic resins, silicone resins, and dicyclopentadiene resin. Of these, at least one selected from urethane resins, epoxy resins, acrylic resins and silicone resins is preferred.

(Urethane Resin)

The urethane resins are prepared from polyols and polyisocyanates. Preferred urethane resins include insulating polyurethane resins defined below. The insulating polyurethane resin means one that is able to provide a cured product having a volume intrinsic resistance value ($\Omega \cdot cm$) of not lower than $10^{10} \Omega \cdot cm$ when determined under conditions of 25±5° C. and 65±5% R·H. A preferred insulating polyurethane resin is one having a dielectric constant of not larger than 6 (1 MHz) and a breakdown voltage of not less than 15 KV/mm.

By controlling an oxygen content of a polyol, the concentration of elution ions and the number in type of the elution ions, an insulating cured product of insulating polyurethane resin is obtained as having a volume intrinsic resistance value of not less than $10^{10} \Omega \cdot cm$, preferably not less than $10^{11} \Omega \cdot cm$. Especially, when the volume intrinsic resistance value is at not less than $10^{11} \Omega \cdot cm$, the insulating properties of a cured product are kept good, ensuring integral sealing with the protective circuit board of the secondary battery. The volume intrinsic resistance value is measured according to the method described in JIS C 2105. More particularly, the value is determined by applying a measuring voltage of 500 V to a sample (thickness: 3 mm) and measuring 60 seconds after the application under conditions of 25±5° C. and 65±5% R·H.

The urethane resins include polyester-based ones making use of polyester polyols, polyether-based ones making use of polyether polyols, and ones using other types of polyols. These may be used singly or in admixture of two or more. The polyol may contain powders. Such powders include inorganic powders such as of calcium carbonate, aluminum hydroxide, aluminum oxide, silicon oxide, titanium oxide, silicon carbide, silicon nitride, calcium silicate, magnesium silicate, carbon and the like, and powders of organic polymers such as polymethyl acrylate, polyethyl acrylate, polymethyl methacrylate, polyethyl methacrylate, polyvinyl alcohol, carboxymethyl cellulose, polyurethane, polyphenol and the like. These may be used singly or in admixture. The powders may be surface-treated, and polyurethane and polyphenol may be provided in foamed powder. In addition, the powders used in the embodiment of the invention may include porous ones.

(Polyol)

(Polyester-Based One)

Polyester-based polyols are reaction products of fatty acids and polyols. The fatty acids include, for example, hydroxy-containing long-chain fatty acids such as recinoleic acid, oxycaproic acid, oxycapric acid, oxyundecanoic acid, oxylinoleic acid, oxystearic acid and oxyhexaundecenoic acid.

The polyols reacting with the fatty acid include glycols such as ethylene glycol, propylene glycol, butylene glycol, hexamethylene glycol, diethylene glycol and the like, trifunctional polyols such as glycerine, trimethylolpropane, triethanolamine and the like, tetrafunctional polyols such as diglycerine, pentaerythritol and the like, hexafunctional polyols such as sorbitol and the like, octafunctional polyols such as sugar and the like, and addition polymers such as of alkylene oxides corresponding to these polyols and fatty, alicyclic and aromatic amines, and addition polymers such as of the alkylene oxides and polyamide-polyamines. Of these, polyester polyols such as glyceride recinoleate, an ester of recinoleic acid and 1,1,1-trimethylolpropane are preferred.

(Polyether-Based One)

Polyols of the polyethers include addition polymers such as of dihydric alcohols such as ethylene glycol, diethylene glycol, propylene glycol, dipropylene glycol, 1,3-butanediol, 1,4-butanediol, 4,4'-dihyroxyphenylpropne, 4,4'-dihydroxyphenylmethane and the like, trihydric or polyhydric alcohols such as glycerine, 1,1,1-trimethylolpropane, 1,2,5-hexanetriol, pentaerythritol and the like, and alkylene oxides such as ethylene oxide, propylene oxide, butylene oxide, α-olefin oxides and the like.

(Other Types of Polyols)

As other types of polyols, mention is made of polyols having a carbon-carbon main chain, e.g. acrylic polyol, polybutadiene polyol, polyisoprene polyol, hydrogenated polybutadiene polyol, polyols obtained by graft-polymerizing AN (acrylonitrile) or SM (styrene monomer) to the above-indicated carbon-carbon polyols, polycarbonate polyols, PTMG (polytetramethylene glycol) and the like.

(Polyisocyanate)

As a polyisocyanate, mention is made of aromatic polyisocyanates, aliphatic polyisocyanates, alicyclic polyisocyanates, and the like. Examples of the aromatic polyisocyanate include diphenylmethane diioscyanate (MDI) polymethylene polyphenylene polyisocyanate (crude MDI), tolylene diisocyanate (TDI), polytolylene polyisocyanate (crude TDI), xylene diisocyanate (XDI), naphthalene diisocyanate (NDI) and the like. Examples of the aliphatic isocyanate include hexamethylene diisocyanate and the like. Examples of the alicyclic polyisocyanate include isophorone diisocyanate (IDI) and the like.

Besides, polyisocyanates obtained by modifying the polyisocyanates with carbodiimides (carbodiimide-modified polyisocyanates), isocyanurate-modified polyisocyanates, ethylene oxide-modified polyisocyanates, urethane polymers (e.g. reaction products of polyols and excess polyisocyanates having an isocyanate group at the molecular terminals) are usable. These may be used singly or in admixture. Of these, diphenylmethane diisocyanate, polymethylene polyphenylene polyisocyanate, carbodiimide-modified polyisocyanates, ethylene oxide-modified polyisocyanates are preferred.

Depending on the properties of reaction curable resins, characteristics such as of heat resistance, flame retardancy, impact resistance, moisture barrier property and the like of the battery pack can be improved.

For instance, when a urethane resin is used, it is preferred that diphenylmethane diisocyanate (MDI), which is an isocyanate having, in addition to a rigid benzene ring structure, the lowest molecular weight, is used as a hard segment structure and a mixing ratio by weight of a polyol base compound and an isocyanate curing agent (base compound/curing agent) is set at 1 or below, preferably at 0.7 or below. This eventually leads to a structure that is high crosslinking density and has a rigid, symmetric molecule chain. Thus, there can be obtained a good heat resistance, good structural strength, improved flame retardancy ascribed to the urethane bonds, and a resin viscosity ensuring high fluid chargeability or injectability.

It will be noted that although a higher content of diphenylmethane diisocyanate (MDI) shows better characteristics with respect to strength and moisture barrier property, its content exceeding 80 wt % leads to the hard segment structures being too large in number, resulting in the degradation of impact strength. Where weatherability is required, it is preferred to mix, with MDI, yellowing-free polyisocyanates based on XDI, IPDI or HDI. In order to enhance a crosslinking density, it is preferred to add low molecular weight trimethylolpropane as a crosslinking agent to the base compound.

When cured, the reaction curable resin should preferably have an impact strength of not less than 6 kJ/m$^2$, more preferably not less than 10 kJ/m$^2$ when subjected to the Izod V-notch test of JIS K7110. This is because when the impact strength is greater than 6 kJ/m$^2$, excellent characteristics are obtained in a 1.9 m drop test and a 1 m drop test. The impact strength of 10 kJ/m$^2$ ensures very excellent characteristics in the drop tests that are assumed to be highest in the probability of occurrence in the marketplace. A higher molecular weight distribution (number average molecular weight/ weight average molecular weight) leads to more improved resin fluidity and moldability, with a tendency that impact resistance becomes deteriorated. Accordingly, the fluidity should preferably be, at least, at a level of not less than 80 mPa·second. If a viscosity is controlled within a range of form 200 mPa·second to 600 mPa·second, the resin can be favorably used and such a range is more preferred.

The reaction curable resin should preferably ensure flame retardancy wherein a fire spread area is not larger than 25 cm$^2$ when determined by a UL746C ¾ inch flame test in a thickness of 0.05 mm to smaller than 0.4 mm.

This is because with the flame retardancy of battery pack, no fire spread is required in a resin thickness that is as very small as 0.05 mm to smaller than 0.4 mm. This is a very specific and severe requirement when taking it into consideration that a resin thickness sufficient to satisfy UL94VO having very high flame retardancy is at about 3 mm. It will be noted that for the purpose of improving flame retardancy, when an inorganic filler ingredient is added to a reaction curable resin in amounts not smaller than 40 wt %, a pierce resistance is simultaneously improved, but with a tendency that fluidity and impact resistance degrade. Additionally, non-halogen flame retardancy has to be secured in view of environmental protection. If phosphate ester-based flame retardant materials are added in larger amounts, armor strength becomes lower, resulting in the degradation of weatherability under high temperature and high humidity conditions.

Where a urethane resin is used as such a reaction curable resin, it is preferred to include a flame-retardant polyol that has a structure containing at least two hydroxyl groups. This is because this polyol is able to yield a flame retardant component to the inside of the polyurethane resin structure, so that especially, when a resin thickness is small, this polyol is effective in improving the flame retardancy along with structural strength being ensured.

This urethane resin has a unique combustion behavior wherein a burner flame is applied to a resin piece, under which it instantaneously withstand the flame and is subsequently burnt up at once and the fire is extinguished without spread, thus responding for the flame retardancy required for a small resin thickness of from 0.05 mm to smaller than 0.4 mm. The reason why such a behavior is shown is not known, but the following matter may be considered, for example. That is, the flame retardancy ascribed to the endothermic reaction of ordinary halogen-based materials or aluminum hydroxide or the addition of phosphate esters that are liable to bleed on surfaces should likewise contribute to carbonization or formation of a heat-insulated layer, but with a reduced effect. In applications of insert molding of an article, such as a battery, whose resin thickness is small and which has a great heat capacity, where a combustion energy in the event of the runaway of a battery is very great, the promotion rate of carbonization, the formation rate of the heat-insulating layer and the location of a flame retardant element are considered to be important for obtaining flame retardancy. As a consequence, a flat sheet making use of a non-halogen resin and reflecting a thickness at the thinnest portion of a battery pack (e.g. from 0.05 mm to 0.4 mm) ensures such flame retardancy at a level of 25 cm$^2$ or below determined by the UL746C ¾ inch flame test.

With the case where such a urethane resin as set out above is not used, a reaction curable resin in a small thickness is able to improve impact strength if the glass transition point (glass transition temperature) is made low. Simultaneously, such a small thickness resin is shrunk by means of a burner flame and the flame is unlikely to spread owing to the increased actual thickness of the shrunk resin, thereby improving flame retardancy. On the other hand, if the glass transition point is too low or two high, strength and safety tend to lower. Accordingly, the glass transition point of a reaction curable resin is from 60° C. to 150° C. and a melting (decomposition) temperature is preferably from 200° C. to 400° C. The glass transition point is more preferably from 85° C. to 120° C. The melting (decomposition) temperature is more preferably from 240° C. to 300° C. If the glass transition point is lower than 60° C., a difficulty is involved in keeping strength for an armor in an ambient temperature of 45° C. If the glass transition point exceeds 150° C., there is concern that the discharge of an energy stored in a battery is delayed in the course of the misuse, thus leading to a serious accident.

The glass transition temperature is set at 60° C. to 150° C., at which when the melting temperature (decomposition temperature) is set at from 200° C. to 400° C., flame retardancy is improved due to the contribution of the endothermic reaction resulting from the melting and decomposition.

If the melting (decomposition) temperature is lower than 200° C., heat absorption occurs at the initial stage of the promotion of carbonization and the formation of the heat-insulating layer, thus not contributing to the flame retardancy. The melting (decomposition) temperature exceeding 400° C. does not contribute to the flame retardancy as well because of the delayed timing of heat absorption.

As a result of investigations, it has been found that when structures of relatively low molecular weight materials by increasing a content of MDI are increased in number to enhance a crosslinking density, a softening behavior at high temperatures becomes faster and higher flexibility is imparted when compared with those of resins of low crosslinking densities made of long-chain, rigid polymers. In this way, not only similar reliability can be secured at an ordinary guaranteed temperature of not higher than 60° C. for use as a battery pack, but also in a malfunction region outside the guaranteed temperature, high reliability is obtained wherein the armor is softened within a very short time before a high energy density battery is in a major accident such as of bursting or firing of the battery and the energy is released and a new effect of showing shape following capability is imparted. In case where a battery generates a gas and is swollen owing to the oxidation-reduction reaction of an electrolytic solution by misuse in a high-temperature region outside the guaranteed temperature, the armor resin of the embodiment of the invention exhibits rubbery physical properties at temperatures higher than the glass transition temperature. Thus, the armor is swollen without increasing the inner pressure of the battery, so that there occurs no further unsafe behavior such as of the internal short-circuiting of the battery.

It has also been found that with the case of the battery pack of the embodiment of the invention, once a transient high temperature condition has been removed, formation gases consisting mainly of carbon dioxide and generated in the battery are absorbed with the negative electrode and in the electrolytic solution, and a characteristic behavior is collaterally shown as having never experienced in existing battery packs, i.e. the swollen molded armor is returned to an original form, like rubber. This is contrary to batteries using an aluminum armor that is ordinary for square batteries, in which if the aluminum can is once swollen by an increased inner pressure, the swollen shape suffering a great dimensional change is held as it is when the inner pressure lowers. This behavior develops without resorting to a specific structural design and thus, very excellent effects of satisfying a volume energy density and reliability at low costs have been confirmed.

The reaction curable resin should preferably have a viscosity of from 80 mPa·second to less than 1000 mPa·second. The coverage failure over the maximum surface of a battery can be avoided by controlling the viscosity within such a range as indicated above. This in turn suppresses characteristic degradation of the battery pack. Although the reaction curable resin is excellent in fluidity because the curing time is longer than with the case of thermoplastic resins. When the viscosity is high, the mold retention increases, so that a manufacturing apparatus becomes expensive with poor productivity. Hence, an improvement in volume energy density and low costs, which are ascribed to the thinning of a molded member of the pack that is a characteristic of the battery pack of the embodiment of the invention, cannot be attained. In contrast, when the viscosity is too low, fluidity becomes too high, so that the production rate lowers owing to burrs from a mold and exudation of a resin toward the substrate portion, with concern that a percent defective rises.

The reaction curable resin (e.g. a urethane resin) is adhesive in nature and has strong bonding to metals and is able to bond to a thermoplastic resin through polar groups thereof to provide a tough integrated structure. Although a thermoplastic polyamide resin has bonding properties, its bonding force is so weak that a physical bonding reinforcement and a high fill pressure are needed. In this connection, however, no such limitation is placed on reaction curable resins. Although the relation between the bonding properties of urethane resin and the aggregation structure is not clear, a tendency has been found wherein a higher crosslinking density leads to poorer bonding properties. In view of this, it is preferred to use a bonding member wherein a number of active hydrogen atoms exist on the surface or a member wherein a number of polar groups that are likely to form a hydrogen bond with a urethane resin exist. Likewise, it is preferred that an undercut portion is formed at a fit portion with the member to prevent disassociation with the member and that the surface of the member is roughened or slit up thereby increasing a substantial bonding area. It is also preferred that the aggregation structure of urethane resin is controlled by controlling the curing temperature conditions to be at a low temperature so that a number of polar groups of the surface is increased, thereby improving bonding properties, or the release properties from a mold is controlled by elevating a temperature sufficient to lower bonding properties.

(Additives)

The reaction curable resin may be admixed with additives such as fillers, flame retardants, defoamers, bactericides, stabilizing agents, plasticizers, thickening agents, antimold agents, and other types of resins.

The flame retardants include triethyl phosphate, tris(2,3-dibromopropyl) phosphate and the like. Other additives include fillers such as antimony trioxide, zeolite and the like, and colorants such as pigments and dyes.

(Catalyst)

Catalysts may be added to the reaction curable resin. The catalyst is added so as to play a role of causing isocyanate and polyols to be reacted with each other and also isocyanate to be dimerized or trimerized, for which known catalysts may be used. More specifically, there can be used triethylenediamine, 2-methyltriethylenediamine, tetramethylhexanediamine, pentamethyldiethylenetriamine, pentamethyldipropyltriamine, pentamethylhexanediamine, dimethylaminoethyl ether, trimethylaminopropylethanolamine, tridimethylaminopropylhexahydrotriazine, and tertiary amines such as tertiary ammonium salts. A metal-based isocyanuration catalyst is preferably used within a range of from 0.5 parts by weight to 20 parts by weight per 100 parts by weight of a polyol. If the metal-based isocyanuration catalyst is smaller than 0.5 parts by weight, isocyanuration does not unfavorably proceed to a satisfactory extent. If the amount of metal-based isocyanuration catalyst is added in amounts of not smaller than 20 parts by weight per 100 parts by weight of a polyol, an effect corresponding to the increased amount is not obtained.

As a metal-based isocyanuration catalyst, there are used, for example, fatty acids and metals. More specifically, mention is made of dibutyltin laurate, lead octylate, potassium ricinoleate, sodium ricinoleate, potassium stearate, sodium stearate, potassium oleate, sodium oleate, potassium acetate, sodium acetate, potassium naphthalate, sodium naphthalate, potassium octylate, sodium octylate and mixtures thereof.

Other catalysts include organotin compounds, for which mention is made, for example, of tri-n-butyltin acetate, n-butyltin trichloride, dimethyltin dichloride, dibutyltin dichloride, trimethyltin hydroxide and the like. These catalysts may be used as they are, or may be dissolved in a solvent, such as ethyl acetate, at a concentration of 0.1 to 20% and added in an amount of 0.01 to 1 part by weight as a solid content per 100 parts by weight of isocyanate. As will be seen from the above, the catalyst may be formulated as it is or in a condition of being dissolved in a solvent. In either case, it is preferred to add, as a solid content, 0.01 to 1 part by weight, more preferably 0.05 to 0.5 parts by weight, per 100 parts by weight of isocyanate. If the amount of the catalyst is smaller than 0.01 part, the formation of a polyurethane resin molded product becomes slow and resinous curing does not occur, thus making the molding difficult. In contrast, when the amount exceeds 1 part by weight, the resin formation becomes extremely high and molding as a shape-retained polymer layer is unlikely to occur.

(Metal Oxide Filler)

A metal oxide filler may be contained in the armor member 40. As a metal oxide filler, mention is made of oxides of silicon (Si), aluminum (Al), titanium (Ti), zirconium (Zr), zinc (Zn) and magnesium (Mg), and mixtures of these oxides. Such a metal oxide filler functions to improve the hardness of the armor member 40 and is disposed in contact with a layer containing a reaction curable resin. As a matter of course, the metal oxide filler may be incorporated in the layer containing a reaction curable resin. In this case, it is preferred that the filler is uniformly dispersed throughout the layer containing a reaction curable resin.

The amount of the metal oxide filler may appropriately vary depending on the type of polymer of the layer containing a reaction curable resin. If the amount relative to the weight of the reaction curable resin-containing layer is smaller than 3%, the hardness of the armor member may not be satisfactorily increased. On the other hand, if the amount exceeds 60%, there may be presented a problem resulting from moldability and brittleness of ceramics in the course of manufacture. Thus, it is preferred to incorporate a metal oxide filler in an amount of about 2 to 50% relative to the weight of the reaction curable resin-containing layer.

When an average size of the metal oxide filler is made smaller, hardness increases. Nevertheless, filling properties at the time of molding are influenced with the possibility that some problem is involved in productivity. On the other hand, if the average size of the metal oxide filler is made great, intended strength is unlikely to obtain, thus leading to the possibility that a dimensional accuracy as a battery pack cannot be adequately attained. Accordingly, the average size of the metal oxide filler is preferably at 0.1 to 40 μm, more preferably at 0.2 to 20 μm.

Further, the metal oxide filler may take various forms such as spherical, flaky, platy, and needle-like forms. Although not specifically limited, spherical particles are preferred because they are easy to prepare and are inexpensively available in the form of a uniform average size. Needle-shaped particles having a high aspect ratio are preferred because strength as a filler is likely to increase. Flaky particles are preferred because filling properties are enhanced when the content of the filler increases. It will be noted that although depending on the purpose and type of material, fillers having different average sizes may be mixed, or fillers having different shapes may be mixed.

The armor member 40 may contain, aside from the metal oxide, various types of additives. For instance, in the layer containing a reaction curable resin, UV absorbers, light stabilizers, curing agents or arbitrary mixtures thereof may co-exist with the metal oxide filler.

(Method of Making a Battery Pack)

Figure 5A:
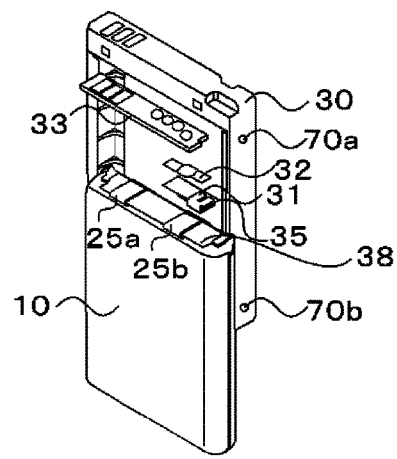
FIGS. 5A to 5D are, respectively, a schematic view illustrating the steps of making the battery pack.
Figure 5B:
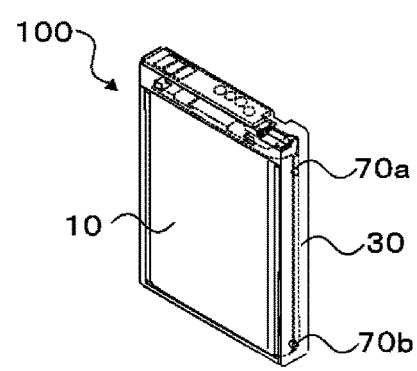

Referring to FIGS. 5A to 5D, the method of making a battery pack is illustrated. As shown in FIG. 5A, the frame 30, battery 10, circuit board 33, PTC element 32 and the like components are integrated by resin molding to provide a resin molded product, i.e. a battery pack.

Initially, the battery 10 is made in the following way, a positive electrode 21 and negative electrode 22, on which a gel electrolyte layer are formed on opposite sides thereof, a separator 23a are successively laminated in the order of the negative electrode 22, separator 23a, positive electrode 21 and separator 23a, and the resulting laminate is wound about a flat core and convolutely wound many times to obtain a convolutely wound battery element. Next, the laminate film 27 is subjected to deep drawing to form a recess 27a, and the battery element 20 is inserted into the recess 27a. The non-drawn portion of the laminate film 27 was folded upward to the recess 27a, after which the outer peripheries along the recess 27a is heated sealed. In this manner, the battery 20 is obtained.

Next, the circuit board 33 is accommodated inside and at the front of the frame 30 and secured by rivets. A PTC protecting tape 31 and a tub protecting tape 38 are disposed in position, and the circuit board 33, battery 10, PTC element 32, metal fitting 35 for negative electrode, positive electrode lead 25a, negative electrode lead 25b and the like are connected such as by resistance welding, thus assembling these with the frame 30. Thus, an assembled body wherein the battery 10, circuit board 33, frame 30 and other parts have been assembled is obtained.

It will be noted that at a side surface of the frame 30, there are provided a charge port 70a for charging a resin into the frame and a discharge portion 70b for discharging the resin to outside of the frame. This charge port 70a and discharge port 70b may be provided at the front surface and rear surface of the frame 30, respectively.

Figure 5C:
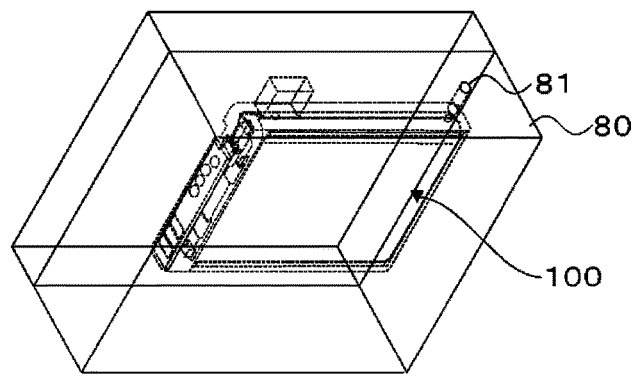
Figure 5D:
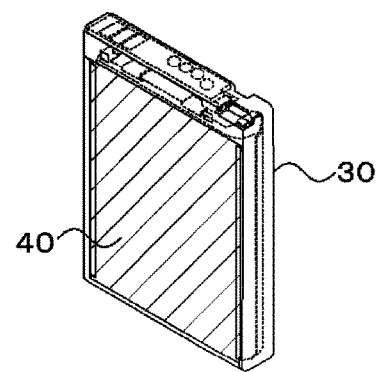

Next, the assembled body is placed in a molding space of a mold 80 as shown in FIG. 5C. Although not particularly shown, the mold 80 may be provided with positioning projections (e.g. four projections). These projections serve to place the battery 10 and the like in position. Next, a reaction curable resin, heated to a given temperature, is charged into the mold from a resin charge port 81, and the resulting resin molding was removed after curing the resin, followed by mold split and deburr finish to obtain a battery pack shown in FIG. 5D.

It will be noted that when the reaction curable resin is filled in the molding space of the mold 80, it is necessary to generally fill the resin while applying a certain level of compression pressure to the armor member so as to inhibit a space from being formed in the molding space. To cope with this, various measures may be adopted so that the battery and protecting circuit board are prevented from moving from given positions in the molding space by the pressure-filled reaction curable resin. For instance, the reaction curable resin may be divided into two or more portions and successively charged so that the battery and the protecting circuit board are, respectively, kept in position in the molding space by means of a non-charged portion, after which the reaction curable resin is flown in every corner of the molding space of the mold. At the same time, for example, there may be used positioning parts in such a way that tapes, rubber pieces and mesh-shaped parts to be integrally molded are wound about the cell or battery once. Alternatively, after fixing the circuit board 33 to the frame 30, the laminate film 27 of the battery 10 and the frame 30 may be bonded together, thereby permitting the battery 10 and the circuit board 33 to be kept in position in the molding space.

Although depending on the resin composition of the reaction curable resin, there is concern that heat generation during curing and curing shrinkage in the course of from two-liquid mixing till curing become very great. In order to suppress the heat generation during curing, it is preferred that a starting low molecular weight resin having a low viscosity is charged at a low temperature of not higher than 40° C. and the mold 80 should be one that has an adequately great capacity and is made of aluminum or SUS having high thermal conductivity. As to the curing shrinkage, the mold is preferably so designed as to provide with a resin pool and the resin is charged in amounts much greater than a necessary amount of the resin and the starting resin is supplied, as necessary, from the resin pool in association with the curing shrinkage.

(Variation)

As the laminate film 27, there may be used, in place of the aluminum laminate film, those films having single or double or more layers and containing a polyolefin film.

The reaction curable resin used in this case is preferably a urethane resin. Preferably, the urethane resin has a mixing ratio by weight of a base polyol compound and an isocyanate curing agent (base compound/curing agent) at 1 or below and contains a molecular chain consisting of diphenylmethane diisocyanate (MDI) in an amount of at least 20 wt % or more of the total of the base compound and the curing agent. This is because moisture barrier properties of such a urethane resin are pronouncedly shown. More preferably, the urethane resin has a mixing ratio by weight of a base polyol and an isocyanate curing agent (base compound/curing agent) at 0.7 or below and contains a molecular chain consisting of diphenylmethane diisocyanate (MDI) in an amount of at least 40 wt % or more of the total of the base compound and the curing agent, for which the moisture barrier properties of the resulting urethane resin are more improved.

Using such a urethane resin, the armor member 40 is imparted with excellent moisture barrier properties. Accordingly, there may be used, instead of an aluminum laminate film, a single or double or more film including a polyolefin film.

It is preferred that the polyolefin film is formed with a deposited layer by vacuum deposition or sputtering so as to enhance moisture barrier properties. The materials used for the deposited layer include known ones such as silica, alumina, aluminum, zinc, zinc alloys, nickel, titanium, copper, indium and the like, of which aluminum is preferred.

The aluminum laminate film should have a thickness of about 20 µm in order to allow drawing along the thickness of the battery and should also have an about 15 µm to 30 µm thick nylon or PET layer to protect the aluminum layer upon the drawing. This tends to lower a volume energy density of the battery pack to an extent of about 10%.

On the other hand, when using a thin polyolefin film, which does not allow permeation of an electrolytic solution of the battery element 20 and ensures moisture barrier properties and which is deposited with aluminum on the surface thereof after sealing of the battery element 20, moisture barrier properties can be held by means of an aluminum layer with a thickness 10 µm or below, which is smaller than the half of existing counterparts.

Since no drawing is effected, the nylon or PET layer may be omitted. In this case, after armoring the battery element 20 with a single or double layer packing film, molding with the urethane resin ensures reliability equal to or greater than in related-art ones.

With laminate film packages, there has been concern that when sealed end faces are folded, moisture infiltration increases owing to the breakage of the aluminum layer and the separation between the aluminum and the CPP layer. Such a failure does not occur because of the moisture barrier properties imparted with the urethane resin and the aluminum deposition after the sealing of the battery. In addition, the battery capacity is significantly improved. Thus, very excellent effects can be obtained. The aluminum deposition is preferably a multilayer deposition of two or more cycles. With the multilayer deposition, reliability can be maintained even when the aluminum layer is at 1 µm or below in thickness. If the thickness is smaller than 0.03 µm, there is concern that pinholes are formed in the deposition surface. Preferably, the aluminum should have a thickness of 0.03 µm or over.

2. Second Embodiment

A battery pack according to the second embodiment of the invention is now described. It will be noted that illustration on similar points as in the first embodiment may be arbitrarily omitted.

(Structure of a Battery Pack)

Figure 6A:
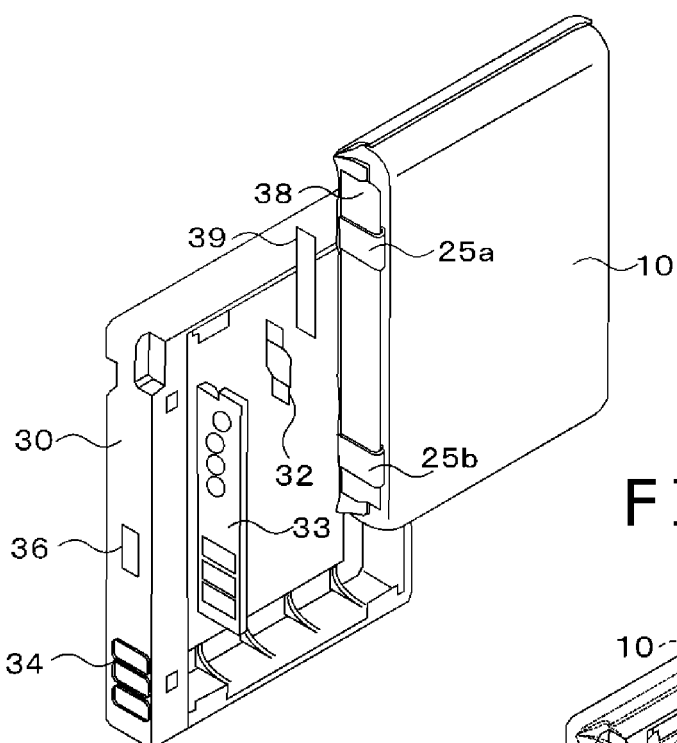
FIGS. 6A and 6B are, respectively, a schematic view showing a configuration example of a battery pack according to another embodiment of the invention.
Figure 6B:
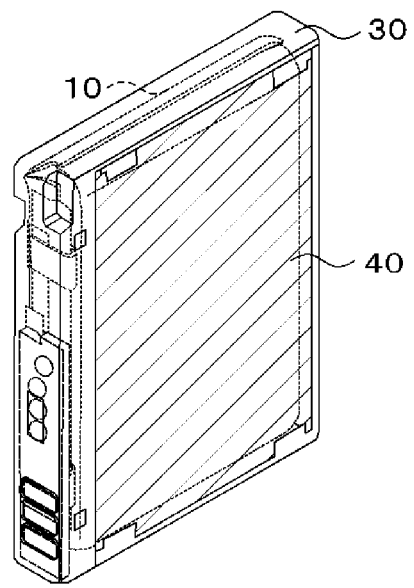

FIG. 6A is an exploded, perspective view showing a configuration example of a battery pack according to the second embodiment of the invention. FIG. 6B is an appearance perspective view showing a configuration example of the battery pack.

As shown in FIGS. 6A and 6B, this battery pack includes a frame 30, a battery 10 and a circuit board 33 as essential component elements of the battery pack. The battery pack is provided with other parts including a PTC element 32, a tub-protecting tape 38, a metal fitting 39 for negative electrode, a submergence detection seal 36, which are connected to the essential component elements and/or are disposed in position of the essential component elements. The battery pack is made by assembling the battery 10, circuit board 33 and other parts including the PTC element 32, and the frame 30 to obtain an assembled body or assembly, followed by subjecting to molding with a reaction curable resin to obtain an integrated resin molding having a substantially rectangular parallelepiped shape. In this battery pack, the assembly of the battery 10, circuit board 33 and other parts including the PTC element 32 is armored with the frame 30 and an armor member 40. The battery is covered entirely with the armor member 40. Moreover, the battery 10 is covered with the frame 30 through the armor member 40 at the side surfaces and part of the upper and lower surfaces of the battery 10.

(Frame)

The frame 30 has a shape corresponding to that of the battery with respect to the front and rear surfaces, left side surface, right side surface and upper and lower surfaces and has a space capable of accommodating the battery 10 therein. When assembling with the battery 10, the upper and lower surfaces of the frame 30 are, respectively, so shaped as to be partly cut away inside the surface in a rectangular form that permits part of the upper and lower surfaces of the battery 10 to be exposed.

The frame 30 has a space capable of accommodating the circuit board 33 at the inner side of the left side surface and the circuit board 33 is placed in this space. The circuit board 33 is fixed in intimate contact with the inner surface of the frame 30 by rivets. The frame 30 is provided with a plurality of openings 34 at the left side surface thereof and the contacts of the circuit board 33 accommodated in the frame 30 are permitted connection to outside through the openings 34.

(Method of Making the Battery Pack)

This battery pack can be made similarly to the first embodiment.

3. Third Embodiment

A battery pack according to the third embodiment of the invention is illustrated. It will be noted that illustration on similar points as in the first embodiment may be arbitrarily omitted.

(Structure of a Battery Pack)

Figure 8A:
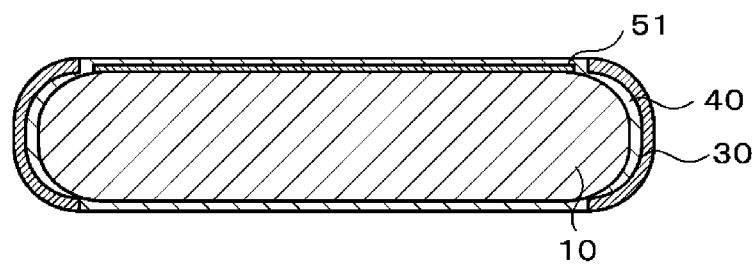
FIGS. 8A and 8B are, respectively, a sectional view showing a configuration example of the battery pack according to the further embodiment of the invention.
Figure 8B:
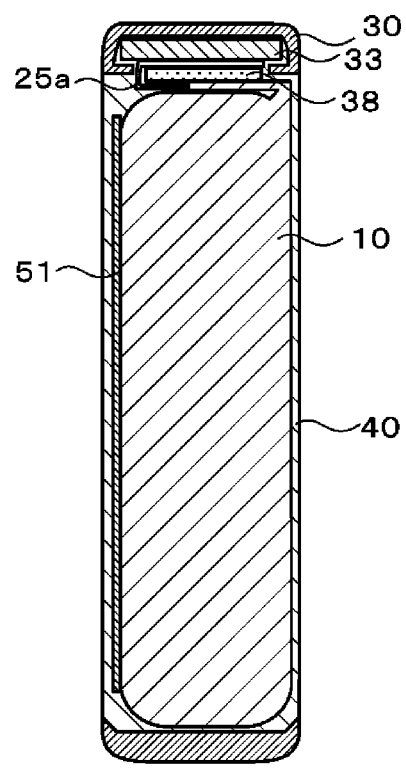

FIG. 7A is an exploded, perspective view showing a configuration example of a battery pack according to the third embodiment of the invention. FIG. 7B is an appearance perspective view showing a configuration example of the battery pack. FIG. 8A is a sectional view taken along line c-c' of FIG. 7B. FIG. 8B is a sectional view taken along line d-d' of FIG. 7B.

As shown in FIGS. 7A and 7B, this battery pack includes a frame 30, one metal sheet 51, a battery 10 and a circuit board 33 as essential component elements of the battery pack. The battery pack is provided with other parts including a PTC protecting tape 31, a PTC element 32, a metal fitting 35 for negative electrode, a submergence detection seal 36, which are connected to the essential component elements and/or are disposed in position of the essential component elements. The battery pack is made by assembling the battery 10, circuit board 33 and other parts including the PTC element 32, and the one metal sheet 51 and the frame 30 to obtain an assembly, followed by subjecting to molding with a reaction curable resin to obtain an integrated resin molding having a substantially rectangular parallelepiped shape. In this battery pack, the assembly of the battery 10, circuit board 33 and other parts including the PTC element 32 is armored with the frame 30, the one metal sheet 51 and an armor member 40. As shown in FIGS. 8A and 8B, the battery is covered entirely with the armor member 40. Moreover, the battery 10 is covered with the frame 30 through the armor member 40 at the side surfaces and part of the upper and lower surfaces of the battery 10. The battery is covered, at the upper surface, with the metal sheet 51, which is in turn covered with the armor member 40.

(Metal Sheet)

The metal sheet 51 is rectangular in shape and one sheet is placed on the upper surface of the battery 10. This metal sheet 51 serves as a spacer for positioning parts including the battery 10 when subjected to resin molding. The metal sheet is 51 is made of aluminum, stainless steels or the like. This metal sheet 51 is able to improve a resistance to piercing load. The metal sheet 51 placed on the upper surface of the battery 10 enables the thickness at a maximum surface to be small, thereby improving a volume energy density.

(Method for Making the Battery Pack)

The frame 30, battery 10, metal plate 51, circuit board 33 and other parts including the PTC element are integrated by resin molding to obtain a resin molding, i.e. a battery pack.

Initially, a battery is made. Next, the circuit board 33 is accommodated at an inner side of the front surface of the frame 30 and fixed with rivets. The PTC protecting tape 31 and the tub-protecting tape 38 are placed in position, and the circuit board 33, battery 10, PTC element 32, a metal fitting for negative electrode 35 and a positive electrode lead 25a and a negative electrode lead 25b are connected such as by resistance welding, which are assembled with the metal sheet 51 and the frame 30. In this way, there is obtained an assembly including the battery 10, circuit board 33, metal sheet 51, the frame 30 and other parts. Next, this assembly is placed in a molding space of a mold 80. A reaction curable resin, heated to a given temperature, is charged into the mold from a resin charge port 81 and after curing, the resulting resin molding is taken out, followed by mold split and deburr finish to obtain a battery pack.

4. Fourth Embodiment (Structure of a Battery Pack)

Figure 9B:
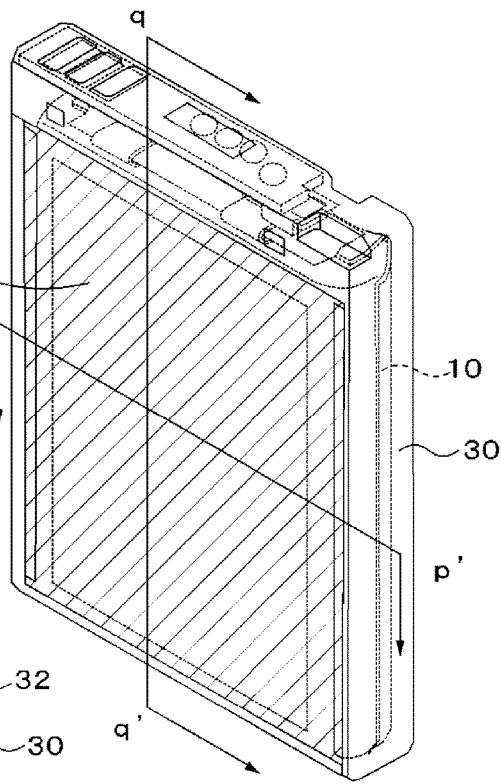
FIGS. 9A and 9B are, respectively, a schematic view showing a configuration example of a battery pack according to a still further embodiment of the invention.
Figure 9A:
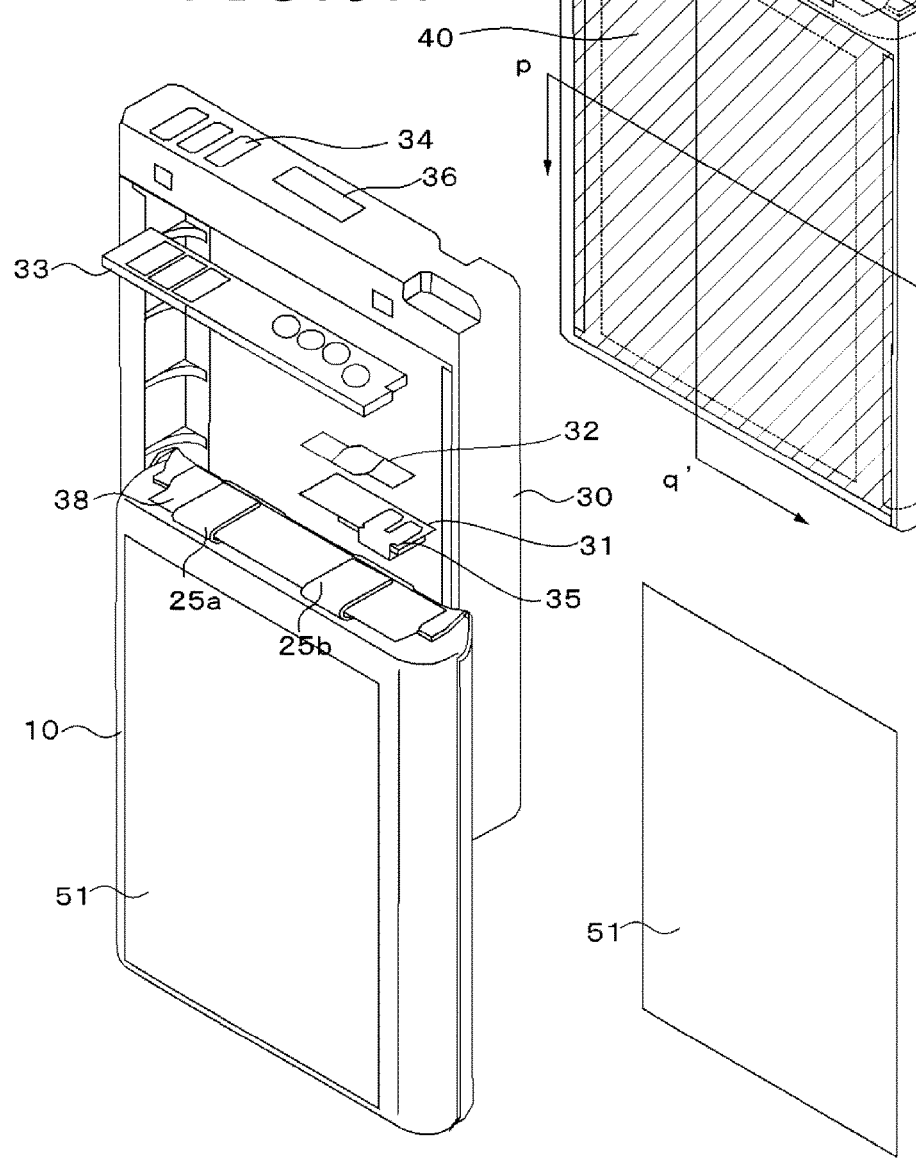
Figure 10A:
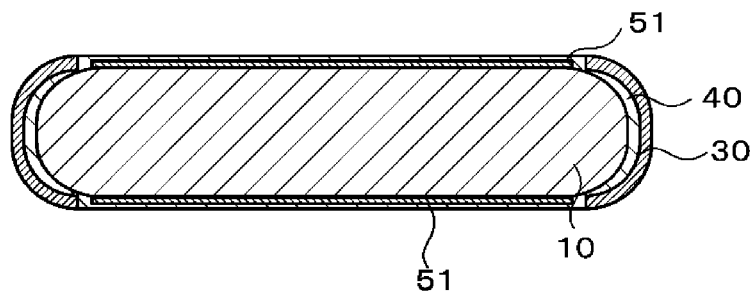
FIGS. 10A and 10B are, respectively, a sectional view showing a configuration example of the battery pack according to the still further embodiment of the invention.
Figure 10B:
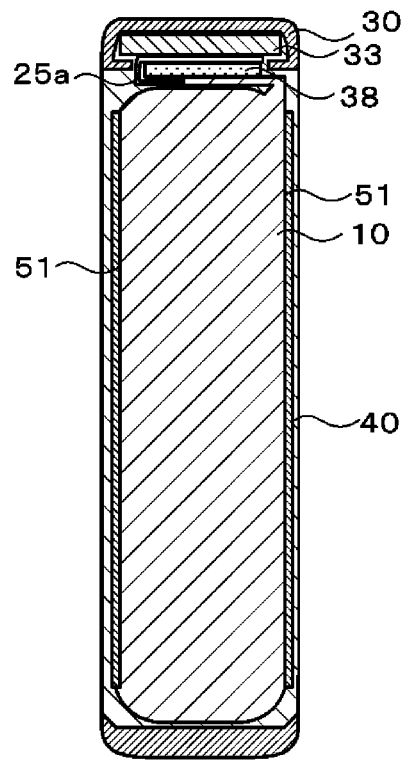

A battery pack according to the fourth embodiment of the invention is illustrated. It will be noted that illustration on similar points as in the third embodiment may be arbitrarily omitted. FIG. 9A is an exploded, perspective view showing a configuration example of a battery pack according to the fourth embodiment of the invention. FIG. 9B is an appearance perspective view showing a configuration example of the battery pack. FIG. 10A is a sectional view taken along line p-p' of FIG. 9B. FIG. 10B is a sectional view taken along line q-q' of FIG. 9B.

As shown in FIGS. 8A and 8B, this battery pack includes a frame 30, two metal sheets 51, a battery 10 and a circuit board 33 as essential component elements of the battery pack. The battery pack is provided with other parts including a PTC protecting tape 31, a PTC element 32, a metal fitting 35 for negative electrode, a submergence detection seal 36, which are connected to the essential component elements and/or are disposed in position of the essential component elements. The battery pack is made by assembling the battery 10, circuit board 33 and other parts including the PTC element 32, and the two metal sheets 51 and the frame 30 to obtain an assembly, followed by subjecting to molding with a reaction curable resin to obtain an integrated resin molding having a substantially rectangular parallelepiped shape. In this battery pack, the assembly of the battery 10, circuit board 33 and other parts including the PTC element 32 is armored with the frame 30, the two metal sheets 51 and an armor member 40. As shown in FIGS. 10A and 10B, the battery is covered entirely with the armor member 40. Moreover, the battery 10 is covered with the frame 30 through the armor member 40 at the side surfaces and part of the upper and lower surfaces of the battery 10. The battery is covered, at the upper and lower surfaces, with the metal sheets 51, which are in turn covered with the armor member 40, respectively.

(Method of Making the Battery Pack)

This battery pack can be made in a manner similar to the third embodiment.

5. Fifth Embodiment

A battery pack according to the fifth embodiment of the invention is illustrated.

(Structure of a Battery Pack)

Figure 11B:
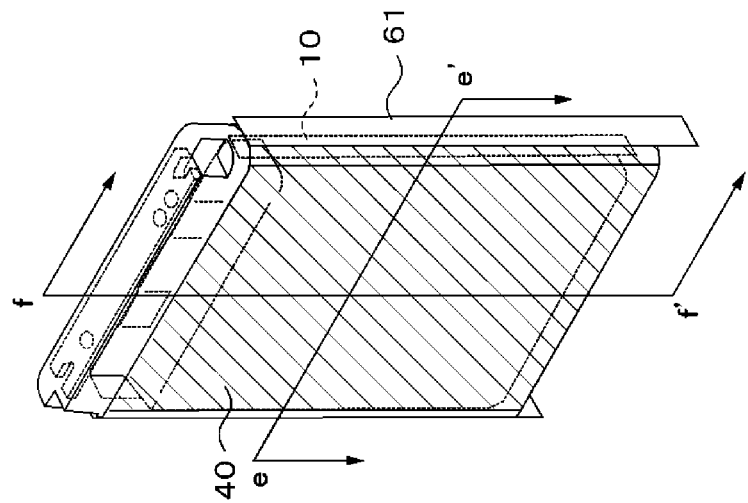
FIGS. 11A and 11B are, respectively, a schematic view showing a configuration example of a battery pack according to still another embodiment of the invention.
Figure 11A:
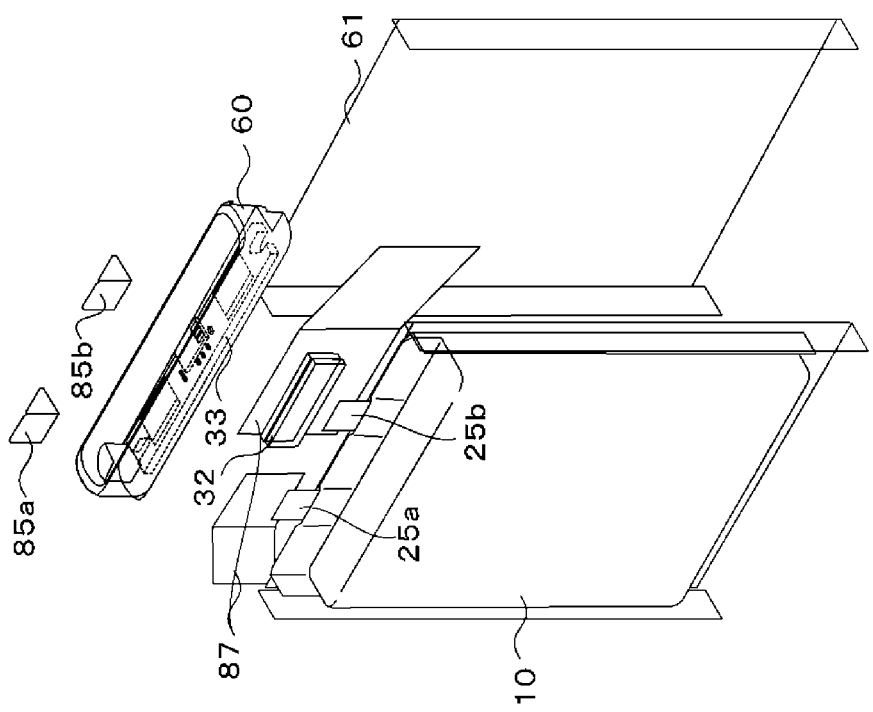
Figure 12A:
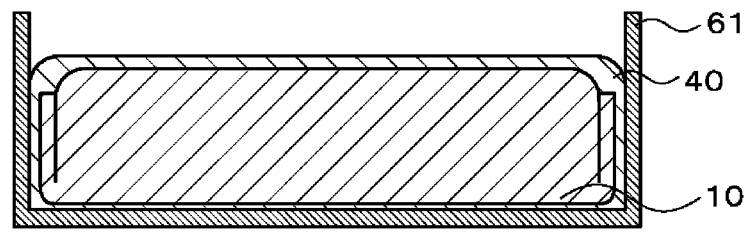
FIGS. 12A and 12B are, respectively, a sectional view showing a configuration example of the battery pack according to the still another embodiment of the invention.
Figure 12B:
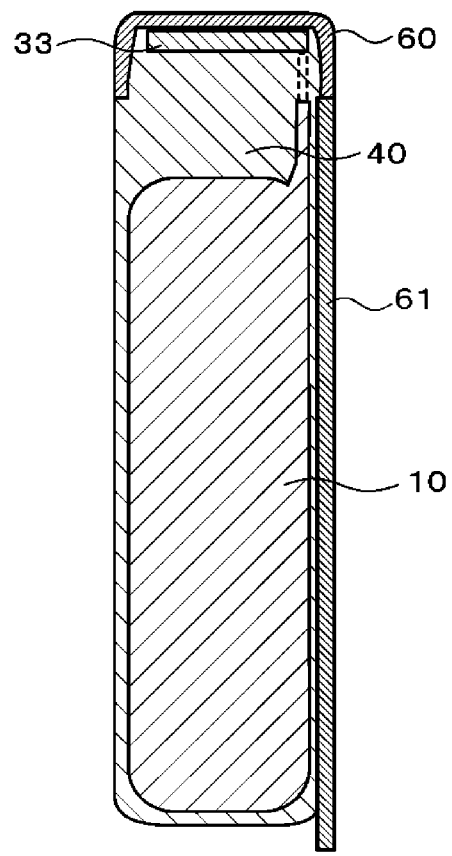

FIG. 11A is an exploded, perspective view showing a configuration example of a battery pack according to the fifth embodiment of the invention. FIG. 11B is an appearance perspective view showing a configuration example of the battery pack. FIG. 12A is a sectional view taken along line e-e' of FIG. 11B. FIG. 12B is a sectional view taken along line f-f' of FIG. 11B.

As shown in FIGS. 11A and 11B, this battery pack includes, as essential component elements, a top cover 60, a U-shaped metal sheet 61, a battery 10 and a circuit board 33 along with other parts including an insulation tape 87 and L metal fittings 85a to 85b of the battery pack. The circuit board 33 is a resin molded board molded along with the top cover 60. This battery pack is made by assembling the battery 10, the circuit board 33 and other parts including the PTC element 32, the top cover 60 and the U-shaped metal sheet 61 to obtain an assembly, followed by subjecting to molding with a reaction curable resin to obtain an integrated resin molding having a substantially rectangular parallelepiped shape. In this battery pack, the assembly of the battery 10, the circuit board 33 and other parts including the PTC element 32 is armored with the U-shaped metal sheet 61 and an armor member 40.

As shown in FIGS. 12A and 12B, the battery is covered entirely with the armor member 40. Moreover, the circuit board 33 is disposed at the front of the battery pack and is covered with the top cover 60. The top cover 60 covers the front surface of the battery 10 through the armor member 40. Moreover, the battery 10 is covered with the U-shaped metal sheet 61 through the armor member 40 at opposite side surfaces and lower surface thereof.

(U-Shaped Metal Sheet)

The U-shaped metal sheet 61 is a folded metal sheet whose section is in the form of a U shape formed by folding a rectangular flat metal sheet at opposite ends along short sides of the metal sheet. This U-shaped metal sheet 61 corresponds to the shape of the battery 10 as created by the main surface having a maximum area and the right side surface and left side surface formed by the folding of the flat metal sheet, thereby forming a space sufficient to accommodate the battery 10. It will be noted that the shape of the U-shaped metal sheet is not limited to one mentioned above. For instance, there may be used one which is formed by folding the opposite ends along the short side of a rectangular flat metal sheet and one end along the length thereof. Thus, the U-shaped metal sheet 61 corresponds to the shape of the battery 10 through the right side surface, left side surface and rear side surface formed by folding the flat metal sheet, thereby forming a space sufficient to receive the battery 10.

The U-shaped metal sheet 61 is made of aluminum, a stainless steel or the like.

(Top Cover)

The top cover 60 is a resin molding provided at the front side of the battery pack. The top cover is preferably formed of a thermoplastic resin such as a polycarbonate, polypropylene, a polyamide for the reason set out with respect to the frame 30. The circuit board 33 is a resin molded board molded along with the top cover 60. It is to be noted that the circuit board 33 may be separately provided, in which the circuit board is fixed to the inner surface of the top cover 60 by rivets.

The top cover is disposed at the front end portion of the U-shaped metal sheet and the positive electrode lead 25*a* and the negative electrode lead 25*b* connected to the circuit board 33 is placed in the top cover 60. The top cover 60 enables the circuit board 33 to be reliably positioned in the molding step of a reaction curable resin.

(Method for Making the Battery Pack)

The top cover 60, the U-shaped metal sheet 61, the battery 10, the circuit board 33 and other component parts including the PTC element 32 are integrated by resin molding to provide a resin molded product, i.e. a battery pack.

Initially, the battery is made. The circuit substrate 33 is molded together with the top cover 60. The insulating tape 87 is disposed in position, and the circuit board 33, the PTC element 32, the L metal fittings 85*a* to 85*b*, the positive electrode lead 25*a* and the negative electrode lead are connected by resistance welding, followed by assembling the U-shaped metal sheet 61 and the top cover 60 to obtain an assembly.

Next, this assembly is mounted in a molding space of the mold 80. Thereafter, a reaction curable resin, heated to a given temperature, is charged into the mold from the resin charge port and cured, and the resulting resin molding is taken out, followed by mold split and deburr finish to obtain a battery pack.

6. Sixth Embodiment

A battery pack according to the sixth embodiment of the invention is described.

(Structure of a Battery Pack)

Figure 13A:
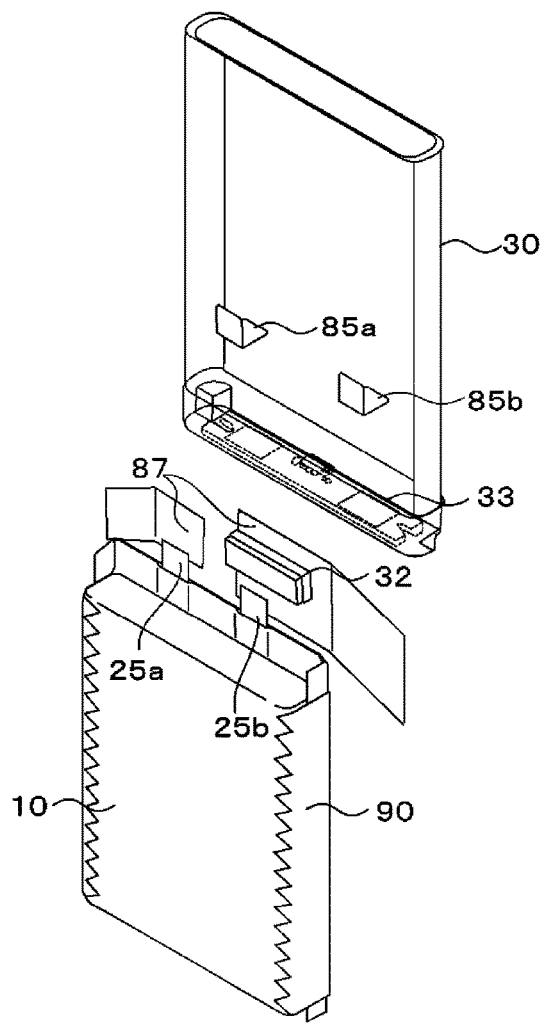
FIGS. 13A and 13B are, respectively, a schematic view showing a configuration example of a battery pack according to yet another embodiment of the invention.
Figure 13B:
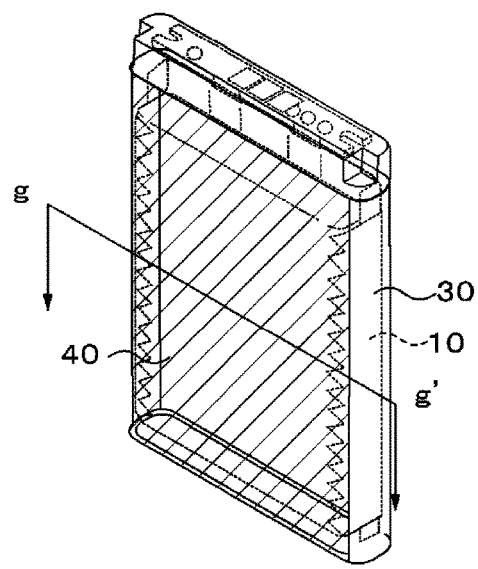
Figure 14:
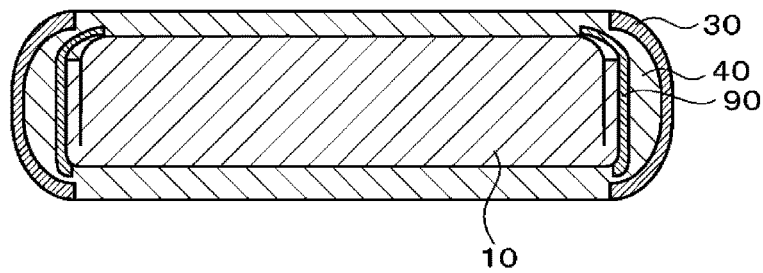
FIG. 14 is a sectional view showing a configuration example of the battery pack according to the yet another embodiment of the invention.

FIG. 13A is an exploded, perspective view showing a configuration example of a battery pack according to the sixth embodiment of the invention. FIG. 13B is an appearance perspective view showing a configuration example of the battery pack. FIG. 14 is a sectional view taken along line g-g' of FIG. 13B.

As shown in FIGS. 13A and 13B, this battery pack includes a frame 30, spacers 90, a battery 10 and a circuit board 33, and other parts including an insulation tape 87 and L metal fittings 85*a* to 85*b*. The circuit board 33 is a resin molded board molded along with the frame 30. This battery pack is an integrated resin molding substantially in the form of a rectangular parallelepiped and is obtained by assembling the battery 10, the circuit board 33, the spacer 90, other parts including the PTC element 32 and the frame 30 to obtain an assembly, and subjecting the assembly to resin molding with a reaction curable resin. In this battery pack, the assembly of the battery 10, the circuit board 33 and other parts including the PTC element 32 is armored with the frame 30 and an armor member 40.

As shown in FIG. 14, the spacers 90 are disposed at the left side surface and right side surface of the battery 10 and also at part of the upper and lower surfaces. The battery disposed with the spacers 90 is covered entirely with the armor member 40. The frame 30 covers the left side surface and right side surface of the battery 10 through the armor member 40. Although not shown in the figures, the frame 30 covers the front and rear surfaces of the battery 10 through the armor member 40.

(Spacer)

Figure 15A:
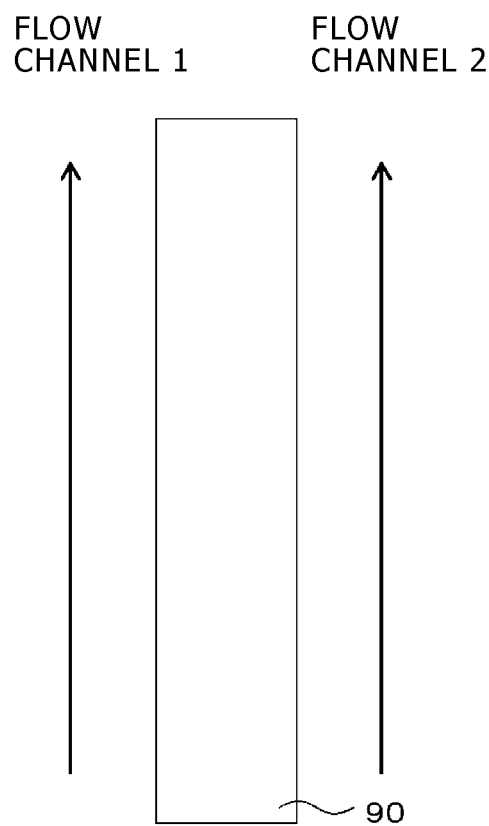
FIGS. 15A and 15B are, respectively, a schematic view illustrating a flow channel control function of a spacer.
Figure 15B:
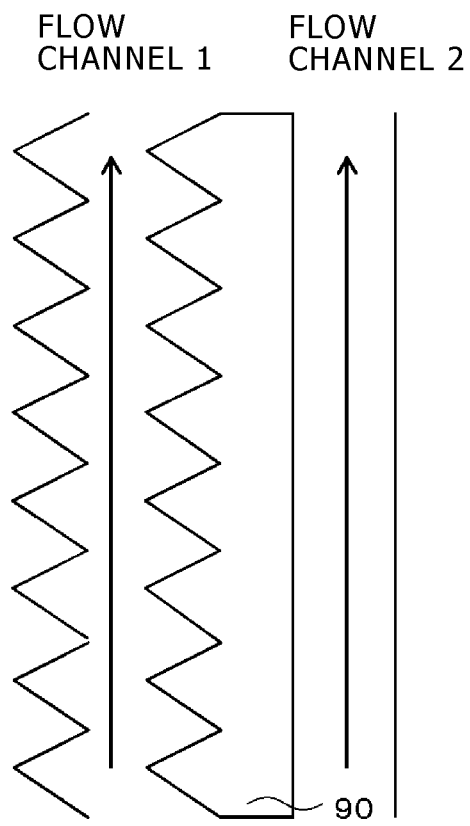

The spacers 90 cover the left side surface and right side surface and a part of the upper surface and a part of the lower surface of the battery 10. The spacers 90 function to position the components of the battery pack and also to control the flow channel of a resin at the time of resin molding. More particularly, the spacer 90 has a flow channel control configuration for increasing a fluid resistance such as of zigzags repeated along the length of the battery. Referring now to FIGS. 15A and 15B, the flow channel control configuration is briefly described. For example, as shown in FIG. 15A, when two sides along the length of the spacer 90 is linear, flow channel 1 and flow channel 2 through which a resin flows, respectively, permit similar degrees of fluidity. On the other hand, as shown in FIG. 15B, in case where the spacer has zigzags repeated along one lengthwise side of the spacer and is linear along the other side, a resin becomes unlikely to flow at flow channel 1 to an extent of about two times less than at flow channel 2.

When such a flow channel control configuration is set at an appropriate position so as to increase a fluid resistance of a resin flown in during resin molding, the fluidity of the resin at arbitrary portions of the battery pack is controlled so as to suppress the resin from not running through portions unlikely to be charged. For example, in order to improve strength of the battery pack, if a difference is made between thickness D2 at a short side portion and thickness D3 at a long side portion and thickness D1 at the maximum area, resin charge is delayed at a portion where a space is great from the structural standpoint of the battery pack (e.g. a molding space provided to ensure the thickness D2 at the short side portion and the thickness D3 at the long side portion). This enables the maximum area, where the resin is unlikely to be charged, to be covered satisfactorily.

Figure 16A:
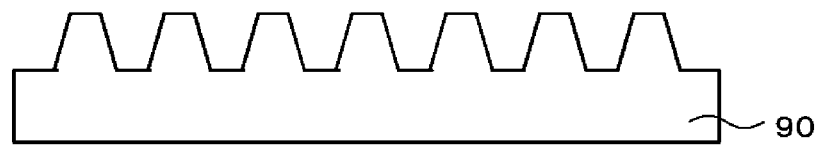
FIGS. 16A and 16B are, respectively, a schematic view showing an example of a configuration of the spacer.
Figure 16B:
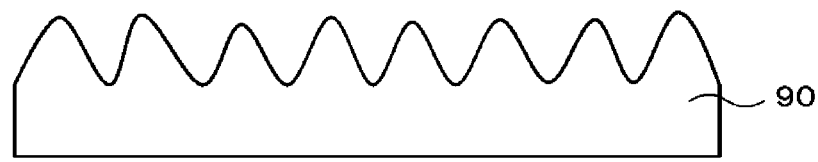

The shape for imparting a function of controlling the flow channel of resin is not limited to a zigzag shape wherein triangular cutouts are made, but various shapes may be used including an indented shape wherein trapezoidal cutouts are made as shown in FIG. 16A, and a wave shape of dull-angled cutouts as shown in FIG. 16B. If the cutouts are sharply angled, foams generated at the time of resin charge are liable to remain at valley portions, adversely influencing the appearance and strength. Thus, a blunt angle of not smaller than 60° is preferred and a shape that is free of portions allowing foams to be accumulated such as in wave forms is preferred. It is preferred that as to how manyfold the flow channel length is increased depending on the shape of cutouts, the flow channel is so designed to come close to a ratio between the short side thickness D2 or a long side thickness D3) and the maximum surface thickness D1.

Mesh-shaped, fibrous or porous materials may be used as a material for the spacer. This enables both an improvement in flow channel control function by allowing a resin to be flown inside the spacer if an occupied area of the spacer 90 becomes great and also an improvement in strength as a result of taking the resin in the spacer 90 and integral molding to be achieved.

Although the spacer 90 used includes any of known materials such as metal sheets, resin covers, self-adhesive tapes and the like. Of these, a fibre cloth tape is preferred in view of simplicity of fixing. Glass cross tapes and cloth tapes using PET as a substrate are much preferred. Tapes making use of polyethylene tend to be poor in adhesion to a molding resin. Although rubbers, acrylic and silicone self-adhesive layers may be used, acrylic ones are preferred when taking, aside from adhesiveness and strength, a side reaction of the adhesive layer with a reaction curable resin into account.

(Method of Making the Battery Pack)

The frame 30, the battery 10, the spacer 90, the circuit board 33 and other components including the PTC element 32 are integrated by resin molding to obtain a resin molding, i.e. a battery pack.

Initially, a battery is made. The circuit board 33 is molded along with the frame 33. An insulating tape 87, etc., are placed in position and the circuit board 33, the PTC element, the L metal fittings 85*a* to 85*b* and tubs are electrically connected such as by resistance welding, followed by assembling with the frame 30 to obtain an assembly.

It will be noted that although not particularly shown, the frame 30 is provided with a charge port for charging a resin and a discharge port for discharging the resin. The charge and discharge ports are provided, for example, at a rear surface of the frame 30. Alternatively, they may be provided at a front surface, right side surface or left side surface of the frame. The charge and discharge ports are preferably provided at the front and rear surfaces having a great resin charge capacity. For instance, where the charge port is provided at a front surface of the frame 30 and the discharge portion is provided correspondingly to a rear surface of the frame 30, the spacer 90 is preferably disposed on a side connecting the charge and discharge ports. Although the frame 30 has a configuration wherein an accommodation portion for the circuit board is provided at a front side, the accommodation portion of the circuit board is provided at a side face side to accommodate the circuit board therein. In this case, the charge and discharge ports are preferably disposed at the right side surface and left side surface, respectively.

Next, the assembly is placed in a molding space of the mold 80. A reaction curable resin, heated to a preset temperature, is charged into the mold from the resin charge port. It will be noted that the resin is flown into the frame through the charge port of the frame. Thereafter, after curing of the resin, the resulting resin molding is taken out, followed mold split and deburr finish to obtain a battery pack.

7. Seventh Embodiment

A battery pack according to the seventh embodiment of the invention is illustrated. Similar points as in the sixth embodiment are arbitrarily omitted.

(Structure of a Battery Pack)

Figure 17A:
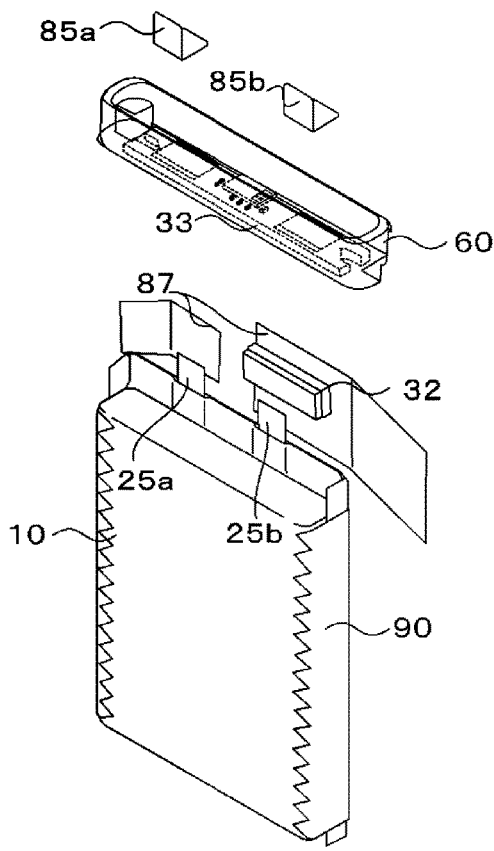
FIGS. 17A and 17B are, respectively, a schematic view showing a configuration example of a battery pack according to another embodiment of the invention.
Figure 17B:
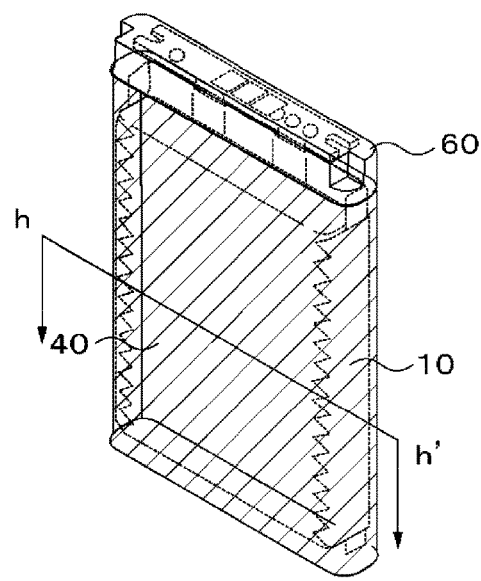
Figure 18:
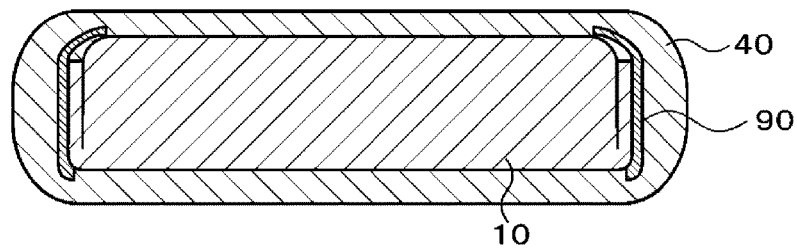
FIG. 18 is a sectional view showing a configuration example of the battery pack according to the another embodiment of the invention.

FIG. 17A is an exploded, perspective view showing a configuration example of a battery pack according to the seventh embodiment of the invention. FIG. 17B is an appearance perspective view showing a configuration example of the battery pack. FIG. 18 is a sectional view taken along line h-h' of FIG. 17B.

As shown in FIGS. 17A and 17B, this battery pack includes a top cover 60, a spacer 90, a battery 10 and a circuit board 33 as essential component elements of the battery pack and other parts including an insulating tape 87 and L metal fittings 85*a* to 85*b*. The circuit board 33 is a resin molded board molded along with the top cover 60. This battery pack is made by assembling the battery 10, the circuit board 33, the top cover 60 and the spacer 90, and other parts including the PTC element 32 to obtain an assembly, followed by subjecting to molding with a reaction curable resin to obtain an integrated resin molding having a substantially rectangular parallelepiped shape. In this battery pack, the assembly of the battery 10, the circuit board 33 and other parts including the PTC element 32 is armored with the top cover 60 and an armor member 40.

As shown in FIG. 18, the spacers 90 are disposed at the left side surface and right side surface of the battery 10 and also at part of the upper and lower surfaces. The battery disposed with the spacers 90 is covered entirely with the armor member 40. Although not shown in the figures, the top cover 60 covers the front surface of the battery 10 through the armor member 40.

(Method of Making the Battery Pack)

The top cover 60, the battery 10, the spacer 90, the circuit board 55 and other components including the PTC element 32 are integrated by resin molding to obtain a resin molded product, i.e. a battery pack.

Initially, the battery is made. The circuit board 33 is molded along with the top cover 60. The insulating tap 87 is placed in position, and the circuit board 33, the PTC element 32, the L metal fittings 85*a* to 85*b* and tubs are electrically connected by resistance welding, followed by assembling with the top cover 60 to obtain an assembly. It will be noted that although not particularly shown, the top cover 60 is provided with a charge port for charging a resin and a discharge port for discharging the resin.

Next, the assembly is placed in a molding space of a mold 80. A reaction curable resin, heated to a preset temperature, is charged from the resin charge port into the mold. It will be noted that the resin is flown in the top cover through the charge port of the top cover. After curing, the resulting resin molding is taken out, followed by mold split and deburr finish to obtain a battery pack.

EXAMPLES

The invention is more particularly illustrated by way of examples, which should not be construed as limiting the invention thereto. The viscosity and MDI content of reaction curable resin used in the examples and comparative examples were measured in the following way.

(Measurement of Resin Viscosity)

There was estimated a viscosity at a discharge temperature based on a method of measuring a viscosity at a constant shear rate by use of a rotary viscometer for plastic/liquid, emulsified or dispersed resins described in JIS K7117-2. The rotary viscometer used was the HAAKE RotoVisco RV1 and the viscosity was estimated from viscosity η=τ shear stress)/γ& shear rate). The frequency was set at 3 Hz and although a measuring temperature was the same as a discharge temperature, discharge at a normal temperature was made on this occasion and the measurement was carried out at 25° C. The viscosity was determined at the time of 30 seconds after commencement of mixing two fluids of a base resin component and a curing agent under agitation.

(Identification of Isocyanate Species by Pyrolysis Gas Chromatography)

There were used, as a pyrolyzer, PY2020D made by Frontier Laboratories Ltd. and, as a mass spectrometer, JMS-T 100 GC made by Jeol Ltd. The pyrolysis temperature was set at 550° C., a carrier gas flow rate of the pyrolyzer set at 30 ml/minute and a split ratio set at 30:1 thereby setting the flow rate of the column at 1 ml/minute. The column temperature was raised at a rate of 5° C./minute from 50° C. to 300° C., at which the temperature was kept. A detector used was a hydrogen flame ionization detector FID. The amount of a sample was at 0.1 mg.

The attributes of peaks on the resulting pyrogram relied on library, a 38 minute peak was attributed as diphenylmethane diisocyanate and a 21 minute peak was as 2,4- and 2,6-tolylene diisocyanate. As to a urethane resin, although there were found peaks of products resulting from the cleavage of the urethane bond by pyrolysis and the cleavage of the ester or ether bond, no mixed fragment of both isocyanate and polyol components was observed. A ratio of a peak area of an isocyanate species to that of all peaks was determined, revealing that an existing ratio of a curing agent in cured resin to an amount of a charged curing agent was not varied.

Example 1

A battery pack having a structure shown in FIGS. 1A and 1B was made. Initially, a lithium ion secondary battery wherein a battery element was armored with an aluminum laminate film was provided. Separately, a polycarbonate frame was obtained by resin molding. A circuit board used was a resin molded board obtained by molding a circuit board along with the frame. Next, the lithium ion secondary battery, the circuit board and other parts including a PTC element were placed in position and/or the respective parts were connected by resistance welding to provide an assembly, followed by further assembling with the frame. In this way, there was obtained an assembly of the frame, the circuit board, the lithium ion secondary battery and other battery pack components. This assembly was inserted into and fixed in a molding space of a mold. The positioning was made with the aid of projections provided in the mold.

Thereafter, at the time when a reaction curable resin, indicated in Table 1, was charged from a resin charge port of the mold and discharged from a resin discharge port of the mold, the reaction curable resin was cured by allowing to stand in a thermostatic chamber set at a temperature (120° C.) indicated in Table 1 for a time (30 minutes) indicated in Table 1. Next, mold split and deburr finish were carried out to obtain a battery pack.

Example 2

A battery pack was obtained in the same manner as in Example 1 except that a polypropylene frame was used in placed of the polycarbonate frame, the circuit board was fixed to the inner front surface of the frame by rivets without molding the circuit board along with the frame, the reaction curable resin was one indicated in Table 1, and the reaction curable resin was cured by allowing to stand in the thermostatic chamber set at a temperature (110° C.) indicated in Table for a time (20 minutes) indicated in the table.

Example 3

A battery pack was obtained in the same manner as in Example 1 except that the structure shown in FIGS. 6A and 6B was adopted, a polypropylene frame was used in placed of the polycarbonate frame, and the reaction curable resin was one indicated in Table 1 and was cured by allowing to stand in the thermostatic chamber set at a temperature (100° C.) indicated in Table for a time (20 minutes) indicated in the table.

Example 4

A battery pack was obtained in the same manner as in Example 3 except that the circuit board was fixed to the inner top surface of the frame by rivets without molding the circuit board along with the frame, and the reaction curable resin was one indicated in Table 1 and was cured by allowing to stand in the thermostatic chamber set at a temperature (90° C.) indicated in Table for a time (15 minutes) indicated in the table.

Example 5

A battery pack having a structure shown in FIGS. 7A and 7B was made. That is, a lithium ion secondary battery similar to that of Example 1 was provided. A circuit board was fixed to an inner front surface of a polypropylene frame by rivets without molding the circuit board along with the frame. Next, the lithium ion secondary battery, an aluminum sheet, the circuit board and other parts including a PTC element were placed in position and/or connected with each other such as by resistance welding, followed by assembling with the frame. Thus, there was obtained an assembly including the frame, the aluminum sheet, the circuit board, the lithium ion secondary battery and other battery pack components. Next, the assembly was inserted into and fixed in a molding space of a mold. The positioning was made by use of the aluminum sheet serving as a spacer.

Thereafter, at the time when a reaction curable resin, indicated in Table 1, was charged from a resin charge port of the mold and discharged from a resin discharge port, the reaction curable resin was cured by allowing to stand in a thermostatic chamber set at a temperature (85° C.) indicated in Table 1 for a time (10 minutes) indicated in the table. Next, mold split and deburr finish were carried out to obtain a battery pack.

Example 6

A battery pack was made in the same manner as in Example 5 except that a reaction curable resin used was one indicated in Table 1, positioning in molding process was made with the aid of projections formed in a mold, and the reaction curable resin was cured by allowing to stand in a thermostatic chamber set at a temperature (80° C.) indicated in Table 1 for a time (10 minutes) indicated in the table.

Example 7

A battery pack was made in the same manner as in Example 5 except that the reaction curable resin used was one indicated in Table 1 and was cured by allowing to stand in a thermostatic chamber set at a temperature (80° C.) indicated in Table 1 for a time (5 minutes) indicated in the table.

Example 8

A battery pack having a structure shown in FIGS. 9A and 9B was made in the same manner as in Example 5 except that a polycarbonate frame was used in place of the polypropylene frame, positioning in molding process was made with use of two aluminum sheets, and the reaction curable resin used was one indicated in Table 1 and cured in a thermostatic chamber set at a temperature (80° C.) indicated in Table 1 for a time (10 minutes) indicated in the table.

Example 9

A battery pack having a structure shown in FIG. 11 was made. Initially, a lithium ion secondary battery as used in Example 1 was provided. A circuit board was fixed to an inner face of a polyamide top cover by rivets. Next, the lithium ion secondary battery, the circuit board and other parts including a PTC element were placed in position and/or connected such as by resistance welding for assembling, followed by further assembling with the top cover and an aluminum U-shaped sheet. In this way, the top cover, the U-shaped metal sheet, the circuit board, the lithium ion secondary element and other battery pack components were assembled to obtain an assembly. This assembly was inserted into a molding space of a mold and fixed. Positioning was made by means of the aluminum U-shaped sheet.

Thereafter, at the time when a reaction curable resin, indicated in table 1, was charged from a resin charge port of the mold and discharged from a resin discharge port, the reaction curable resin was cured by allowing to stand in a thermostatic chamber set at a temperature (80° C.) indicated in Table 1 for a time (5 minutes) indicated in the table. Next, mold split and deburr finish were made to obtain a battery pack.

Example 10

A battery pack was made in the same manner as in Example 9 except that a SUS U-shaped sheet was used in placed of the aluminum U-shaped sheet, and the reaction curable resin used was one indicated in table 1 and cured by allowing to stand in a thermostatic chamber set at a temperature (80° C.) indicated in Table 1 for a time (5 minutes) indicated in the table.

Example 11

A battery pack having a structure shown in FIG. 13 was made. Initially, a lithium ion battery as used in Example 1 was provided. A circuit board was not integrated with a frame by resin molding, but was fixed to the inner face at a top side of a polycarbonate frame by rivets. Next, the lithium ion secondary battery, a polyethylene tape spacer (of a straight form), the circuit board and parts including a PTC element were placed in position and/or connected such as by resistance welding for assembling, followed by further assembling with a frame. Thus, there was obtained an assembly of the frame, the spacer, the circuit board, the lithium ion secondary battery and other battery pack components. Next, this assembly was inserted into and fixed in a molding space of a mold. Positioning was made by means of the spacer.

Thereafter, at the time when a reaction curable resin, indicated in table 1, was charged from a resin charge port of the mold and discharged from a resin discharge port, the reaction curable resin was cured by allowing to stand in a thermostatic chamber set at a temperature (80° C.) indicated in Table 1 for a time (5 minutes) indicated in the table. Next, mold split and deburr finish were made to obtain a battery pack.

Example 12

A battery pack was made in the same manner as in Example 11 except that a paper tape spacer (straight form) was used in place of the polyethylene tape spacer, the reaction curable resin used was one indicated in Table 1, and the reaction curable resin was cured by allowing to stand in a thermostatic chamber set at a temperature (80° C.) indicated in Table 1 for a time (5 minutes) indicated in the table.

Example 13

A battery pack was made in the same manner as in Example 11 except that a normex tape spacer (zigzag form) was used in place of the polyethylene tape spacer, and the reaction curable resin used was one indicated in Table 1 and was cured by allowing to stand in a thermostatic chamber set at a temperature (80° C.) indicated in Table 1 for a time (5 minutes) indicated in the table.

Example 14

A battery pack was made in the same manner as in Example 11 except that a normex tape spacer (zigzag form) was used in place of the polyethylene tape spacer, and the reaction curable resin used was one indicated in Table 1 and was cured by allowing to stand in a thermostatic chamber set at a temperature (80° C.) indicated in Table 1 for a time (4 minutes) indicated in the table.

Example 15

A battery pack was made in the same manner as in Example 11 except that a normex tape spacer (indented form) was used in place of the polyethylene tape spacer, the reaction curable resin used was one indicated in Table 1 and was cured by allowing to stand in a thermostatic chamber set at a temperature (80° C.) indicated in Table 1 for a time (3 minutes) indicated in the table.

Example 16

A battery pack having a structure shown in FIG. 17 was made. Initially, a lithium ion battery as used in Example 1 was provided. A circuit board was not integrated with a frame by resin molding, but was fixed to the inner face at a top side of a polycarbonate top cover by rivets. Next, the lithium ion secondary battery, a normex spacer (of an indented form), the circuit board and parts including a PTC element were placed in position and/or were connected such as by resistance welding and thus assembled, followed by further assembling with the top cover. Thus, there was obtained an assembly of a frame, the top cover, the circuit board, the lithium ion secondary battery and other battery pack components. Next, this assembly was inserted into and fixed in a molding space of a mold. Positioning was made by means of the spacer.

Thereafter, at the time when a reaction curable resin, indicated in table 1, was charged from a resin charge port of the mold and discharged from a resin discharge port, the reaction curable resin was cured by allowing to stand in a thermostatic chamber set at a temperature (80° C.) indicated in Table 1 for a time (2 minutes) indicated in the table. Next, mold split and deburr finish were made to obtain a battery pack.

Example 17

A battery pack was made in the same manner as in Example 16 except that a glass cloth tape spacer (wave-shaped form) was used in place of the normex tape spacer, and the reaction curable resin used was one indicated in Table 1 and was cured by allowing to stand in a thermostatic chamber set at a temperature (75° C.) indicated in Table 1 for a time (1 minute) indicated in the table.

Example 18

A battery pack was made in the same manner as in Example 16 except that a polyamide top cover was used in placed of the polycarbonate top cover, the circuit board was molded along with the top cover, a PET tape spacer (wave-shaped form) was used in place of the normex tape spacer, and the reaction curable resin used was one indicated in Table 1 and was cured by allowing to stand in a thermostatic chamber set at a temperature (50° C.) indicated in Table 1 for a time (1 minute) indicated in the table.

Comparative Example 1

A battery pack was made in the same manner as in Example 1 except that the reaction curable resin used was one indicated in Table 1 and was cured by allowing to stand in a thermostatic chamber set at a temperature (120° C.) indicated in Table 1 for a time (20 minutes) indicated in the table.

Comparative Example 2

A battery pack was made in the same manner as in Example 1 except that a polyethylene terephthalate (PET) frame was used in place of the polycarbonate frame, and the reaction curable resin used was one indicated in Table 1 and was cured by allowing to stand in a thermostatic chamber set at a normal temperature as indicated in Table 1 for a time (one day) indicated in the table.

Comparative Example 3

A polypropylene frame was used in place of the polycarbonate frame. A thermoplastic resin indicated in Table 1 was used. Initially, a lithium ion secondary battery wherein an battery element was armored with an aluminum laminate was provided. A polypropylene frame integrated with a circuit board disposed on an inner face at a top side thereof was obtained by resin molding. Next, the lithium ion secondary battery, a circuit board and other parts including a PTC element were placed in position and/or connected such as by resistance welding and thus assembled, followed by further assembling with the frame. In this way, there was obtained an assembly of the frame, the circuit board, the lithium ion secondary battery and other battery pack components. Next, this assembly was integrally molded with a resin by resin melt extrusion molding under conditions indicated in Table 1. Thus, a battery pack was made.

Comparative Example 4

A battery pack was made in the same manner as in Comparative Example 3 except that a polyethylene frame was used in placed of the polypropylene frame and a thermoplastic resin indicated in Table 1 was used.

Comparative Example 5

A battery pack was made in the same manner as in Comparative Example 3 except that a thermoplastic resin indicated in Table 1 was used.

Comparative Example 6

A battery pack was made in the same manner as in Comparative Example 3 except that a reaction curable resin indicated in Table 1 was used.

(Evaluation)

The thus made battery packs were evaluated in the following way.

(Thickness at a Thinnest Portion in Molding Thickness (Maximum Surface Thickness D1), Short Side Thickness D2)

Figure 19A:
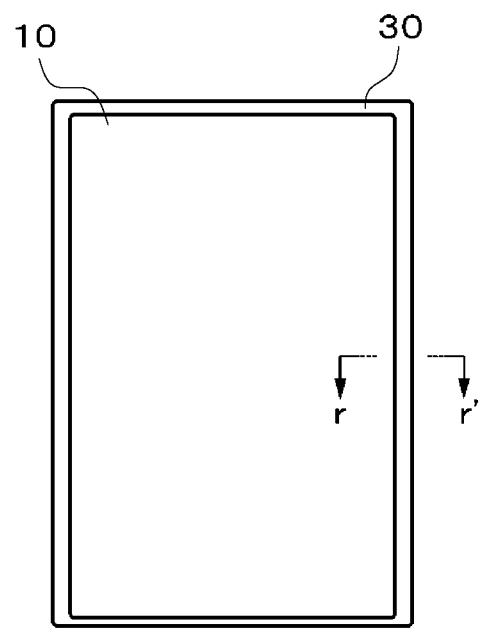
FIGS. 19A and 19B are, respectively, a schematic view illustrating the measurement of thickness.
Figure 19B:
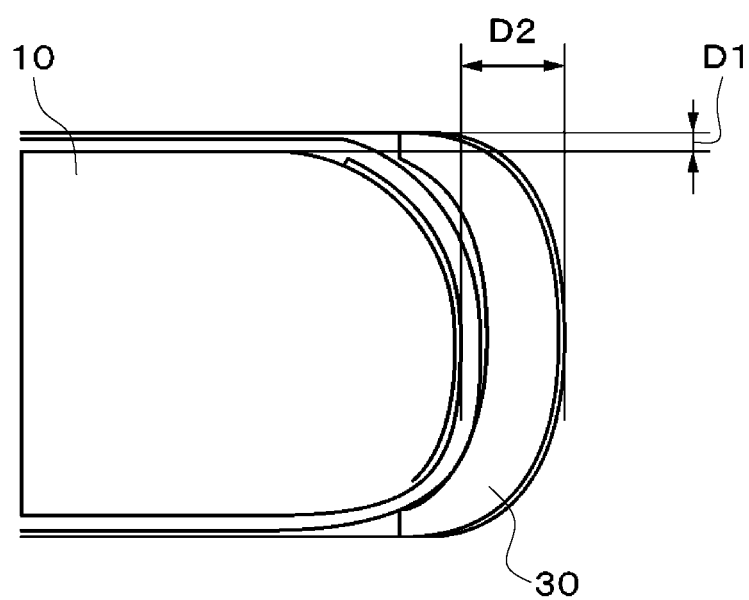

The maximum surface thickness shown in FIGS. 19A and 19B was measured. A thickness of an armor member wherein the main surface of the battery 10 was taken as a starting point of measurement was measured at three points in the vicinity of the center and an average value thereof was determined as maximum surface thickness D1. The maximum thickness D2 at a short side (a length of the armor member in a short-side direction from the most projected point of the battery 10 along the short side taken as a starting point of measurement to a front surface of the battery pack taken as an ending point of measurement) was measured. Moreover, a ratio between the thickness D1 at the maximum surface and the thickness D2 at the short side portion was calculated. It will be noted that the battery pack shown in FIGS. 19A, and 19B correspond to the structure of Example 1 (shown in FIG. 1). FIG. 19A schematically shows a battery pack and FIG. 19B is a sectional view taken along line r-r'.

(Rated Energy Density)

A cycle of 1C constant current/constant voltage charge effected to an upper limit of 4.2V for 15 hours and 1C constant current discharge to a cutoff voltage of 2.5 V was repeated and a rated energy density was determined from the first cycle discharge capacity.

$$\text{Rated energy density}(Wh/l) = (\text{average discharge voltage}(V) \times \text{rated capacity}(Ah)/\text{battery pack volume} \quad (1)$$

It is to be noted that 1C indicates a current value capable of discharging a theoretical capacity of a battery in one hour.

(Number of Coverage Failures)

1000 battery packs of the respective examples were subjected to cast molding and cured under curing temperature and time conditions indicated in Table 1 and removed from the mold, followed by appearance inspection. A sample having foams and a portion where no resin was covered by the appearance inspection was counted as a coverage failure. Those conditions wherein defective samples were not larger than 26 in number per 1000 samples (a percent defective was not larger than 0.26%) were determined as good conditions.

(Number of Impedance Defects)

The impedance of substrate and protecting element-attached batteries prior to cast molding of the batteries to be used in battery packs of the respective examples was measured under conditions of 1 kHz by use of Battery Hi-Tester 3561, made by Hioki E.E. Corporation. The substrate and protecting element-attached batteries were each subjected to cast molding and cured under curing temperature and time conditions indicated in Table 1 and removed from the mold, followed by measuring again the impedance for electric characteristic inspection. Those samples whose impedance was raised to not lower than 5% by the electric characteristic inspection were determined as an impedance defective product.

(Drop Test 1)

In order to observe a variation in mechanical strength of battery packs of the respective examples, 10 battery packs were made in every example and all the battery packs were naturally dropped from a height of 2 m on a concrete floor. Ten drops for each battery pack were carried out so that six flat faces of each battery pack hit on the floor. Damage-free packs were as accepted and cracked packs or packs whose parts came off were as rejected.

(Drop Test 2)

A dimensional variation (At) was measured after free fall of battery packs of the respective examples from a height of 1 m on a concrete floor 50 times.

(Maximum Bulge in a Storage Test of 105° C. and 5 Hours)

In order to measure an increase in thickness of battery packs of the respective examples in a storage test at 105° C., 10 battery packs of each example were made and subjected to 1C constant current/constant voltage charge to an upper limit of 4.2 V for 15 hours at a temperature of 23° C. A thickness t1 of the charged battery pack prior to the storage test was measured. The battery pack, charged to 4.2 V, was stored in a thermostatic chamber set at 105° C. and the thickness of the battery pack was measured 1 hour, 3 hours and 5 hours after the storage, and a maximum thickness was taken as t2. The maximum bulge was estimated in terms of dimensional variation $\Delta t = t2 - t1$ and an average value of $\Delta t$ of the 10 battery packs was calculated.

(Variation in Thickness after Cooling after Storage at 105° C. for 5 Hours)

Battery packs after storage at 105° C. for 5 hours were naturally cooled at a normal temperature and thickness t3 of the respective battery packs was measured one day after the cooling. A variation in thickness after the cooling was estimated as dimensional variation $\Delta t = t3 - t1$.

(Flame Retardancy Test)

Based on a UL 746C ¾ inch flame test of the UL standards (Underwriters Laboratories Inc.), 300 mm×300 mm three flat test pieces, which were uniformly molded to have the same thickness as at the thinnest portion of battery pack were used, and a burner flame controlled to have a ¾ inch flame was applied to a central lower end of the flat test piece and kept for 30 seconds. Thereafter, the burner flame was removed from the test piece. At an interval of one minute, the burner flame was again applied to the same portion for further 30 seconds, followed by removing the burner flame. It was confirmed that a flame combustion duration after completion of the first and second flame applications was within one minute and a combustion area of the test piece was an area not greater than a footprint of the battery pack, i.e. not larger than 25 cm$^2$. It was decided that the thickness of the test piece was sufficient to satisfy the UL 746 C ¾ inch flame test.

(Izod V-Notch Impact Strength (kJ/m$^2$) of JIS K7110)

An impact resistance at a normal temperature was estimated based on the Izod impact test of JIS K71100. The device used was a digital impact tester DG-UB, made by Toyo Seiki Seisaku-Sho Ltd., and an average value of five test pieces was obtained.

The results of the measurements are shown in Table 1. Table 1 is reproduced in FIGS. 20A-2E. FIGS. 20A, 20B and 20D illustrate a table showing the resin viscosities in Examples 1 to 18 that are controlled within an optimum range. FIGS. 20C and 20E illustrate a table showing comparative examples 1 to 6, in which the resin viscosities are outside the optimum range.

TABLE 1

| | Reaction curable resin | Cover part (thermo-plastic resin) | Cover part (metal sheet) | Structure | Fixing of substrate | Manner of positioning (spacer, mold projection) | Spacer material | Content of MDI estimated from thermal decomposition GC-MS | Flame Retardant Polyol containing at least two hydroxyl groups | Manner of curing | Curing time | Viscosity of charged resin fluid | Glass transition point (Tg) (° C.) | Melting point (thermal pyrolysis Tm (° C.) | Packaging material | Thickness of aluminum layer deposited on packaging material (μm) |
|---|---|---|---|---|---|---|---|---|---|---|---|---|---|---|---|---|
| Example 1 | Silicone | Polycarbonate frame part | Nil | FIG. 1 | Integral molding of substrate and resin | Mold projection | Nil | 0 | Nil | 120° C. | 30 min | 990 | 58 | 190 | Aluminum laminate | Nil |
| Example 2 | Epoxy resin | Polypropylene frame part | Nil | FIG. 1 | Riveted | Mold projection | Nil | 0 | Nil | 110° C. | 20 min | 900 | 152 | 410 | Aluminum laminate | Nil |
| Example 3 | Acrylic resin | Polypropylene frame part | Nil | FIG. 6 | Integral molding of substrate and resin | Mold projection | Nil | 0 | Nil | 100° C. | 20 min | 80 | 150 | 400 | Aluminum laminate | Nil |
| Example 4 | Polyurethane | Polypropylene frame part | Nil | FIG. 6 | Riveted | Mold projection | Nil | 18 | Nil | 90° C. | 15 min | 180 | 60 | 200 | Aluminum laminate | Nil |
| Example 5 | Polyurethane | Polypropylene frame part | One aluminum sheet (front surface) | FIG. 7 | Riveted | Metal sheet serving also as a spacer | Aluminum sheet | 83 | Nil | 85° C. | 10 min | 610 | 80 | 230 | Aluminum laminate | Nil |
| Example 6 | Polyurethane | Polypropylene frame part | One aluminum sheet (front surface) | FIG. 7 | Riveted | Mold projection | Aluminum sheet | 20 | Nil | 80° C. | 10 min | 200 | 124 | 310 | Aluminum laminate | Nil |
| Example 7 | Polyurethane | Polypropylene frame part | One aluminum sheet (front surface) | FIG. 7 | Riveted | Metal sheet serving also as a spacer | Aluminum sheet | 80 | Nil | 80° C. | 5 min | 600 | 85 | 240 | Aluminum laminate | Nil |
| Example 8 | Polyurethane | Polycarbonate frame part | Two SUS sheets (front and back surfaces) | FIG. 9 | Riveted | Metal sheet serving also as a spacer | SUS sheet | 20 | Nil | 80° C. | 10 min | 200 | 124 | 310 | Aluminum laminate | Nil |

TABLE 1-continued

| | | | | | | | | | | | | | | | | |
|---|---|---|---|---|---|---|---|---|---|---|---|---|---|---|---|---|
| Example 9 | Poly-urethane | Poly-amide top cover | One aluminum U-shaped sheet (front surface) | FIG. 11 | Riveted | Metal sheet serving also as a spacer | Aluminum sheet | 80 | Nil | 80° C. | 5 min | 600 | 85 | 240 | Aluminum laminate | Nil |
| Example 10 | Poly-urethane | Poly-amide top cover | One SUS U-shaped sheet (back surface) | FIG. 11 | Riveted | Metal sheet serving also as a spacer | SUS sheet | 37 | (CH₃CH₂)₂POCH₂P(CH₂CH₂OH)₃ | 80° C. | 5 min | 400 | 120 | 300 | Aluminum laminate | Nil |
| Example 11 | Poly-urethane | Poly-carbonate frame part | Nil | FIG. 13 | Riveted | Straight spacer | Poly-ethylene tape | 72 | (CH₃CH₂)₂PO-CH₂S(CH₂CH₂OH)₃ | 80° C. | 5 min | 400 | 110 | 260 | Aluminum laminate | 0.03 |
| Example 12 | Poly-urethane | Poly-carbonate frame part | Nil | FIG. 13 | Riveted | Straight spacer | Paper tape | 40 | (CH₃CH₂)₂PO-CH₂N(CH₂CH₂OH)₂ | 80° C. | 5 min | 400 | 110 | 260 | Aluminum laminate | 10 |
| Example 13 | Poly-urethane | Poly-carbonate frame part | Nil | FIG. 13 | Riveted | Zigzag spacer | Normex tape | 55 | (CH₃CH₂)₂PO-CH₂N(CH₂CH₂OH)₂ | 80° C. | 5 min | 400 | 110 | 260 | Aluminum laminate | 2 |
| Example 14 | Poly-urethane | Poly-carbonate frame part | Nil | FIG. 13 | Riveted | Zigzag spacer | Normex tape | 60 | | 80° C. | 4 min | 400 | 110 | 260 | Aluminum laminate | 1 |
| Example 15 | Poly-urethane | Poly-carbonate frame part | Nil | FIG. 13 | Riveted | Indented spacer | Normex tape | 70 | | 80° C. | 3 min | 400 | 110 | 260 | Aluminum laminate | 0.8 |
| Example 16 | Poly-urethane | Poly-carbonate top cover | Nil | FIG. 17 | Riveted | Indented spacer | Normex tape | 60 | | 80° C. | 2 min | 400 | 110 | 260 | Poly-ethylene film + two layers of PET film | 0.8 |
| Example 17 | Poly-urethane | Poly-carbonate top cover | Nil | FIG. 17 | Riveted | Wave-shaped spacer | Glass cross tape | 60 | | 75° C. | 1 min | 400 | 110 | 260 | Vacuum-deposited poly-ethylene film + two layers of PET film | 0.8 |
| Example 17 | Poly-urethane | Poly-carbonate top cover | Nil | FIG. 17 | Riveted | Wave-shaped spacer | PET tape | 60 | | 50° C. | 1 min | 400 | 110 | 260 | Single layered vacuum-deposited poly-propylene film | 0.8 |
| Example 18 | Poly-urethane | Poly-amide top cover | Nil | FIG. 17 | Integral molding of substrate and resin | Wave-shaped spacer | PET tape | 60 | (CH₃CH₂)₂PO-CH₂N(CH₂CH₂OH)₂ + OP(OPhCH₃)₃ | 50° C. | 1 min | 400 | 110 | 260 | Single layered vacuum-deposited poly-propylene film | 0.8 |

TABLE 1-continued

| | | | | | | | | | | | | | | |
|---|---|---|---|---|---|---|---|---|---|---|---|---|---|---|
| Comparative Example 1 | Silicone | Polycarbonate frame part | Nil | FIG. 1 | Integral molding of substrate and resin | Mold projection | Nil | 0 | 120°C | 20 min | 1000 | −20 | 260 | Aluminum laminate | Nil |
| Comparative Example 2 | Epoxy resin | Polyethylene terephthalate frame part | Nil | FIG. 1 | Integral molding of substrate and resin | Mold projection | Nil | 0 | Allowed to stand at a normal temperature | One day | 70 | 155 | 220 | Aluminum laminate | Nil |
| Comparative Example 3 | Thermoplastic ABS | Polypropylene frame part | Nil | FIG. 1 | Integral molding of substrate and resin | Mold projection | Nil | 0 | Resin melt extrusion molding at 120°C | 20 sec | 2000 | 120 | 240 | Aluminum laminate | Nil |
| Comparative Example 4 | Thermoplastic polyurethane | Polyethylene frame part | Nil | FIG. 1 | Integral molding of substrate and resin | Mold projection | Nil | 0 | Resin melt extrusion molding at 120°C | 20 sec | 1500 | 110 | 220 | Aluminum laminate | Nil |
| Comparative Example 5 | Thermoplastic polyamide | Polypropylene frame part | Nil | FIG. 1 | Integral molding of substrate and resin | Mold projection | Nil | 0 | Resin melt extrusion molding at 180°C | 30 sec | 1000 | 50 | 190 | Aluminum laminate | Nil |
| Comparative Example 6 | Urethane | Polymethylacrylate frame part | Nil | FIG. 1 | Integral molding of substrate and resin | Mold projection | Nil | 0 | 120°C | 30 min | 990 | 58 | 190 | Aluminum laminate | Nil |

| | Thinnest portion in molding thickness (maximum surface thickness D1/mm) | Maximum thickness at a short side portion D2/mm | Ratio between maximum surface thickness/short side thickness (D2/D1) | Rated E density Wh/l | Number of coverage failures upon charge of reaction curable resin (per 1000 samples) | 10 cycles of 2 m drop test | Dimensional variation in thickness after 50 cycles of 1 m drop test | Maximum bulge in a storage test at 105°C for 5 hours (mm) | Variation in thickness after cooling after storage at 105°C for 5 hours (mm) | Burned area in a UL746C 3/4 inch flame test/cm² | Izod v-notched impact strength in JIS K7110 (kJ/m²) |
|---|---|---|---|---|---|---|---|---|---|---|---|
| Example 1 | 0.38 | 0.4 | 1.1 | 520 | 19 | Ten samples all accepted | 1.5 | 1.4 | 1.3 | 25 | 5 |
| Example 2 | 0.35 | 0.4 | 1.1 | 525 | 16 | Ten samples all accepted | 1.3 | 1.3 | 1.2 | 25 | 5 |
| Example 3 | 0.35 | 2.2 | 6.3 | 525 | 26 | Ten samples all accepted | 1.2 | 1.2 | 1 | 25 | 5 |
| Example 4 | 0.35 | 0.36 | 1.0 | 525 | 11 | Ten samples all accepted | 0.9 | 1 | 0.8 | 21 | 5 |
| Example 5 | 0.35 | 1.8 | 5.1 | 525 | 14 | Ten samples all accepted | 0.7 | 0.9 | 0.7 | 20 | 5 |
| Example 6 | 0.35 | 0.45 | 1.3 | 525 | 11 | Ten samples all accepted | 0.6 | 0.7 | 0.3 | 16 | 8 |
| Example 7 | 0.35 | 1.1 | 3.1 | 525 | 14 | Ten samples all accepted | 0.4 | 0.5 | 0.1 | 13 | 6 |
| Example 8 | 0.05 | 0.09 | 1.8 | 555 | 11 | Ten samples all accepted | 1.1 | 1 | 0.7 | 24 | 8 |
| Example 9 | 0.05 | 0.21 | 4.2 | 555 | 13 | Ten samples all accepted | 0.9 | 0.8 | 0.6 | 20 | 6 |
| Example 10 | 0.3 | 0.6 | 2.0 | 545 | 9 | Ten samples all accepted | 0.4 | 0.5 | 0.1 | 13 | 9 |

TABLE 1-continued

| | | | | | | | | | | |
|---|---|---|---|---|---|---|---|---|---|---|
| Example 11 | 0.3 | 1.2 | 4.0 | 545 | 9 | Ten samples all accepted | 0.4 | 0.5 | 0.1 | 12 | 8 |
| Example 12 | 0.15 | 0.4 | 2.7 | 545 | 8 | Ten samples all accepted | 0.3 | 0.3 | 0 | 9 | 10 |
| Example 13 | 0.15 | 0.45 | 3.0 | 545 | 3 | Ten samples all accepted | 0.3 | 0.3 | 0 | 9 | 10 |
| Example 14 | 0.1 | 0.2 | 2.0 | 550 | 3 | Ten samples all accepted | 0.3 | 0.3 | 0 | 9 | 11 |
| Example 15 | 0.1 | 0.4 | 4.0 | 550 | 2 | Ten samples all accepted | 0.3 | 0.3 | 0 | 8 | 12 |
| Example 16 | 0.1 | 0.3 | 3.0 | 550 | 2 | Ten samples all accepted | 0.3 | 0.3 | 0 | 8 | 12 |
| Example 17 | 0.1 | 0.3 | 3.0 | 550 | 0 | Ten samples all accepted | 0.3 | 0.3 | 0 | 8 | 12 |
| Example 18 | 0.1 | 0.3 | 3.0 | 550 | 0 | Ten samples all accepted | 0.3 | 0.3 | 0 | 7 | 12 |
| Comparative Example 1 | 0.45 | 0.5 | 1.1 | 500 | 211 | 9 samples not accepted (separated) | Broken down before 50 cycles | 1.5 | 1.3 | Burnt out | 8 |
| Comparative Example 2 | 0.38 | 1.5 | 3.9 | 520 | 157 | 10 samples not accepted (cracked) | Broken down before 50 cycles | 1.5 | 1.2 | Burnt out | 4 |
| Comparative Example 3 | 0.45 | 2.5 | 5.6 | 500 | Impedance failure in all samples | 6 samples not accepted (separated) | Broken down before 50 cycles | 1.5 | 1.2 | Burnt out | 10 |
| Comparative Example 4 | 0.45 | 3.5 | 7.8 | 500 | Impedance failure in all samples | 3 samples not accepted (cracked) | Broken down before 50 cycles | 1.5 | 1.2 | Burnt out | 4 |
| Comparative Example 5 | 0.5 | 4.5 | 9.0 | 480 | Impedance failure in all samples | 8 samples not accepted (separated) | Broken down before 50 cycles | 1.5 | 1.3 | Burnt out | 5 |
| Comparative Example 6 | 0.04 | 0.04 | 1.0 | 560 | 157 | 10 samples not accepted (cracked) | Broken down before 50 cycles | 1.5 | 1.5 | Burnt out | 5 |

As shown in Table 1, the resin viscosities in Examples 1 to 18 are controlled within an optimum range and thus, formation of a number of coverage failure products can be suppressed. On the other hand, with Comparative Examples 1 to 6, the resin viscosities are outside the optimum range, a number of coverage failure products were formed.

8. Other Embodiment

The invention is not limited to these embodiments set forth hereinbefore and many variations and applications may be possible within the scope not departing from the spirit of the invention. For example, the variation described in the first embodiment may be applicable to any of the second to seventh embodiments. The configurations set out in the respective embodiments may be appropriately combined.

In addition, for example, batteries of the types other than a lithium ion secondary battery may be used and configurations using a plurality of batteries may be possible. In recent years, there has been used a battery pack wherein a plurality of batteries are integrated such as a battery pack for vehicles which has been put into practice in the form of a nickel hydrogen battery, and a battery pack used in note personal computers and power tools. However, with a battery pack provided with a plurality of batteries, the batteries undergo repeated cycles of expansion and shrinkage in association with charge and discharge. Even though a deformation amount of individual batteries is small, the total amount cannot be neglected. To cope with this, in the past, it has been to use a cylindrical battery whose deformation amount is small. In this connection, however, there arises a problem in that a space between adjacent batteries becomes great, so that a volumetric efficiency lowers. This problem has had to be solved. In case where a plurality of square batteries packed with a laminate film are used, it is necessary to provide a space for absorbing such a dimensional change or deformation as set out above, heat is generated in association with charge and discharge cycles and battery units have to be placed at spatial intervals for the purpose of securing insulation associated with high voltage. Thus, even when using square batteries whose volumetric efficiency is better than cylindrical batteries, there is a problem in that a volume energy density cannot be increased. In the practice of the invention, when using a plurality of batteries, particularly, in the form of square form, there can be provided a battery that is excellent in dimensional accuracy, mechanical strength and heat dissipating properties.

The present application contains subject matter related to that disclosed in Japanese Priority Patent Application JP 2010-088540 filed in the Japan Patent Office on Apr. 7, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A battery pack, comprising:
a frame which includes a frame opening;
a battery which has an upper main surface opposed to a lower main surface, a right side surface opposed to a left side surface, and a front side surface opposed to a rear side surface, wherein:
leads of the battery extend from the front side surface, the battery is housed within the frame,
the frame opening exposes one of the upper main surface or the lower main surface of the battery, and
the frame covers the right side surface, the left side surface, the front side surface, and the rear side surface of the battery;
a plurality of spacers which are configured to cover the left side surface, the right side surface, a portion of the upper main surface, and a portion of the lower main surface;
a resin layer which comprises a resin and is integrally around the battery and fills gaps between the battery and the frame,
wherein the resin layer forms a single integrated armor member,
wherein the resin layer covers exposed portions of the upper main surface and the lower main surface of the battery in the frame opening, and at least portions of each of the right side surface, the left side surface, the front side surface, and the rear side surface of the battery,
wherein a first side of at least one spacer of the plurality of spacers is along a length of the at least one spacer and a second side of the at least one spacer is opposite to the first side, and
wherein the at least one spacer has a flow channel control configuration that comprises a zigzag shape along the first side of the at least one spacer and a linear shape along the second side of the at least one spacer; and
an exterior surface that includes both a first exterior surface of the single integrated armor member in the frame opening and second exterior surfaces of side portions of the frame,
wherein:
the resin layer includes a reaction curable resin which has a viscosity of greater than 80 mPa·second and less than 1000 mPa·second,
a thickness of the single integrated armor member on at least one of the upper main surface or the lower main surface of the battery ranges from 0.05 mm to 0.4 mm,
a combined thickness of the single integrated armor member and the frame, which covers at least one of the right side surface, the left side surface, the front side surface, or the rear side surface of the battery, is 2 to 4 times that of the thickness of the single integrated armor member which covers at least one of the upper main surface or the lower main surface of the battery, and
the reaction curable resin comprises a urethane resin which includes a flame-retardant polyol, wherein the flame-retardant polyol contains at least two hydroxyl groups.

2. The battery pack according to claim 1, wherein the frame further includes:
a charge port configured to charge the reaction curable resin, and
a discharge port which faces the charge port, the discharge port configured to discharge the reaction curable resin, wherein the at least one spacer is located between the charge port and the discharge port.

3. The battery pack according to claim 1, wherein the frame is configured as a resin molding member which includes at least one thermoplastic resin, wherein the at least one thermoplastic resin comprises one of a polycarbonate, a polypropylene, or a polyamide.

4. The battery pack according to claim 1, further comprising a circuit board configured to connect to the battery, wherein the circuit board is accommodated in the frame.

5. The battery pack according to claim 1, wherein the reaction curable resin has a glass transition point from 60° C. to 150° C., a melting point from 200° C. to 400° C., and an impact strength of 6 to 12 kJ/m$^2$.

6. The battery pack according to claim 1, wherein the urethane resin has the flame-retardant polyol which serves as a base component and an isocyanate which serves as a curing agent, wherein a mixing ratio of the base component to the curing agent by weight is equal to or less than 1.

7. The battery pack according to claim 1, wherein the battery includes a battery element packed with a packaging material.

8. The battery pack according to claim 7, wherein the packaging material is made of a laminate film.

9. The battery pack according to claim 8, wherein the laminate film is made of an aluminum laminate film.

10. The battery pack according to claim 8, wherein:
   the laminate film is one of a single-layer film or a double layer film, and
   the laminate film includes a polyolefin film.

11. The battery pack according to claim 7, wherein the packaging material includes an aluminum deposited layer on a surface of the packaging material.

* * * * *